United States Patent
Firestone

[15] 3,643,899
[45] Feb. 22, 1972

[54] AIRPLANE WITH SPATIAL PANORAMA

[72] Inventor: Floyd A. Firestone, 172 Clinton Ave., Dobbs Ferry, N.Y. 10522

[22] Filed: Nov. 13, 1969

[21] Appl. No.: 876,434

Related U.S. Application Data

[60] Division of Ser. No. 806,346, Mar. 7, 1969, Pat. No. 3,572,615, which is a continuation-in-part of Ser. No. 660,700, Aug. 15, 1967, abandoned, Continuation-in-part of Ser. No. 616,056, Feb. 14, 1967, abandoned.

[52] U.S. Cl. .................. 244/118 P, 244/121, 244/129 R, 296/84, 88/1.5 R, 33/46.5
[51] Int. Cl. ......................................................... B64c 1/00
[58] Field of Search ................ 244/121, 129 R, 129 W, 118; 296/84; 33/63, 46 AS

[56] References Cited

UNITED STATES PATENTS

| | | | |
|---|---|---|---|
| 1,429,166 | 9/1922 | Rommer | 33/46 AS |
| 2,023,719 | 12/1935 | Arrison | 296/84 |
| 2,593,525 | 4/1952 | Beckham | 296/84 |
| 3,038,756 | 6/1962 | Heimer | 296/84 |
| 3,241,791 | 3/1966 | Piasecki | 244/6 |

OTHER PUBLICATIONS

" Is Aviation Going Automatic?" Popular Mechanics, February, 1965, P. 110– 111.

*Primary Examiner*—Milton Buchler
*Assistant Examiner*—Steven W. Weinrieb
*Attorney*—Teare, Teare and Sammon

[57] ABSTRACT

A fixed wing airplane having a substantially transparent fuselage, which in straight and level flight permits both the pilot and copilot to see the entire ground and sky in all directions and from nadir to zenith, with the exception of roughly two steradians of solid angle in the quadrant above and behind him. The necessary opaque struts which cross the transparent areas are so oriented and dimensioned that the distant scene as seen through the major areas of the plane appears to be continuous, advantage being taken of the fact that the pilot has two eyes whose lines of regard are not simultaneously occulted by narrow struts properly spaced and oriented. Utilizing the same fact of vision, instrument arrays and stressed skin structures are described, that the pilot can see through.

16 Claims, 40 Drawing Figures

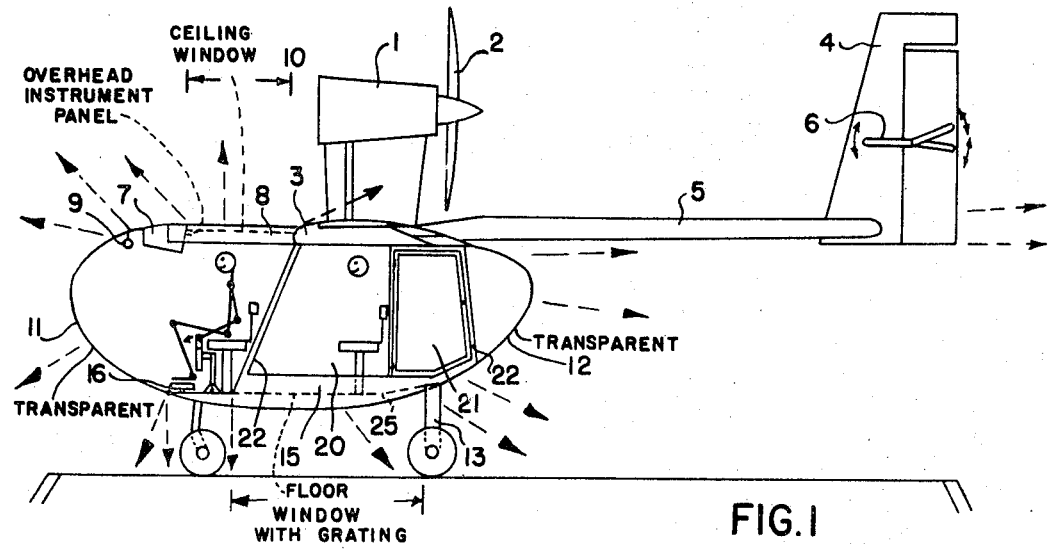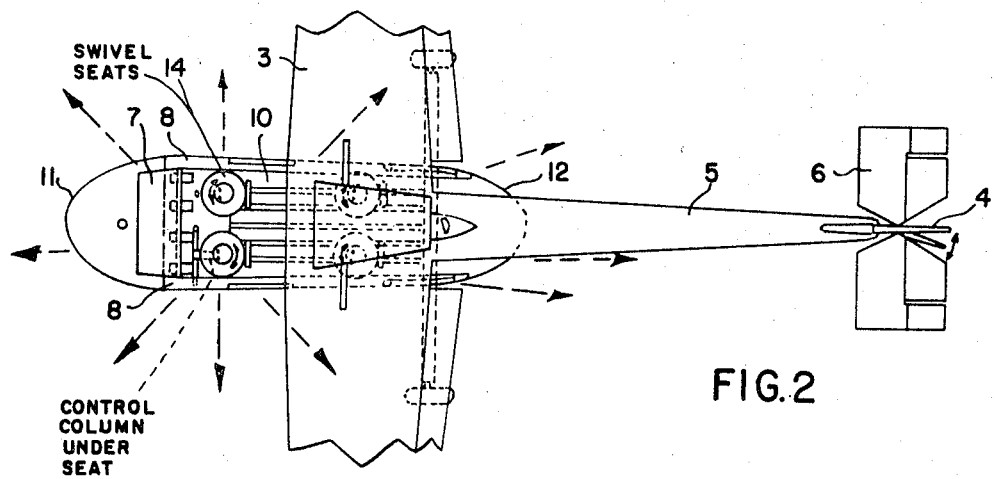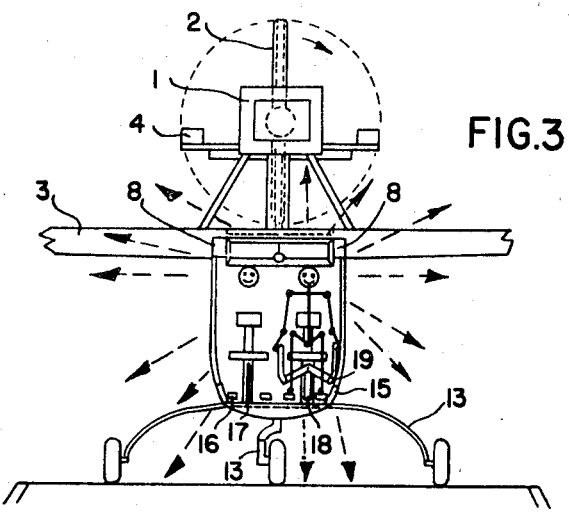

INVENTOR.
FLOYD A. FIRESTONE
BY
Teare, Teare & Sammon
ATTORNEYS

INVENTOR.
FLOYD A. FIRESTONE
BY
*Teare, Teare & Sammon*
ATTORNEYS

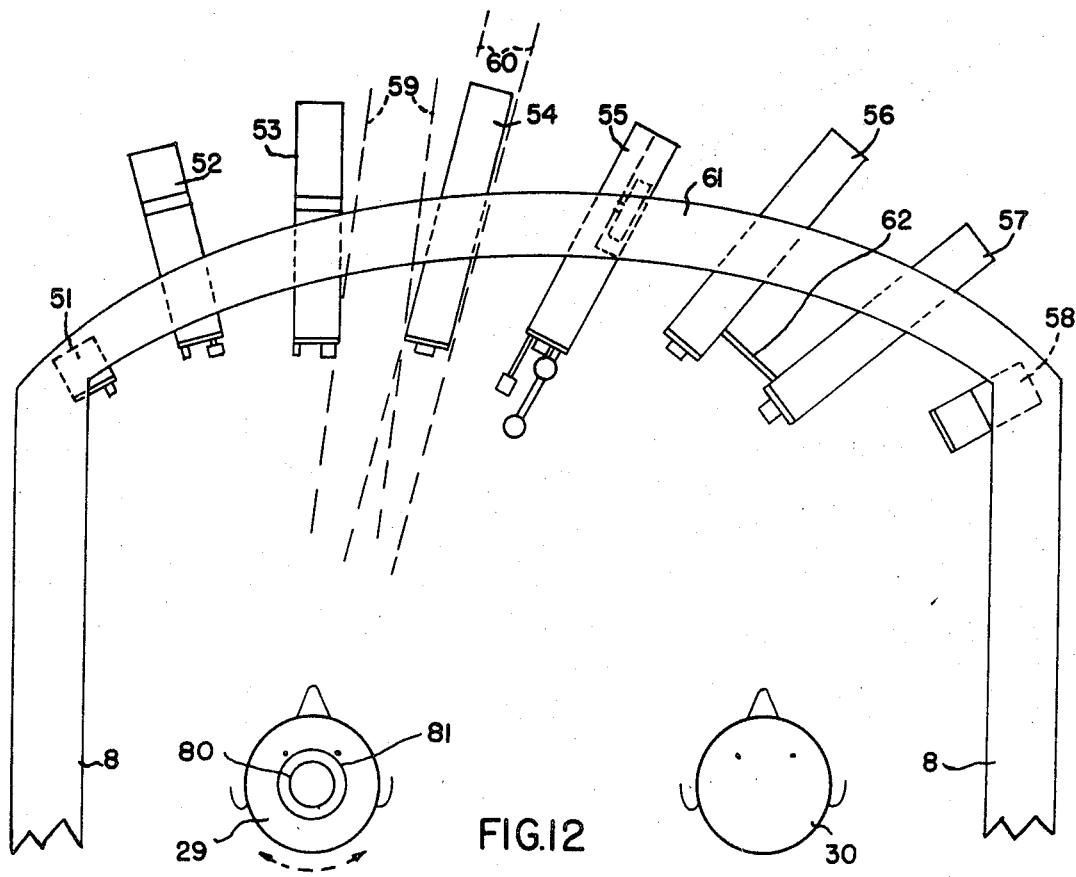
FIG.12
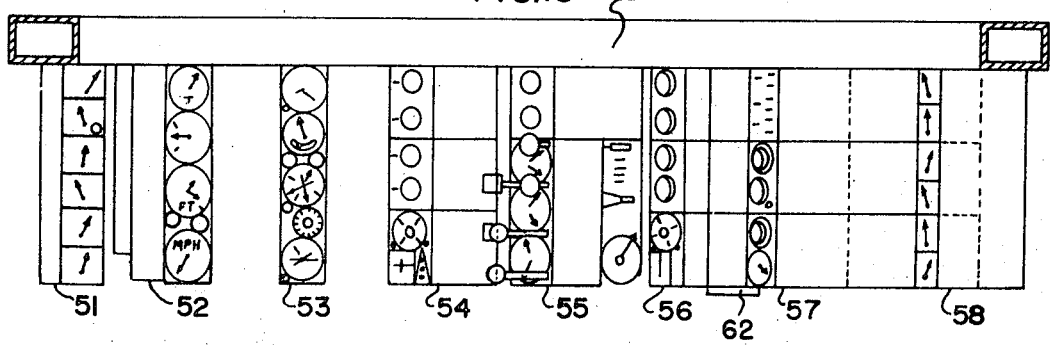
FIG.13
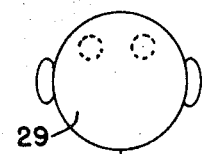
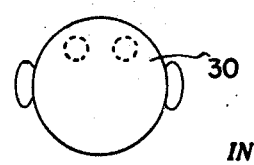
INVENTOR.
FLOYD A. FIRESTONE
BY
Teare, Teare & Sammon
ATTORNEYS

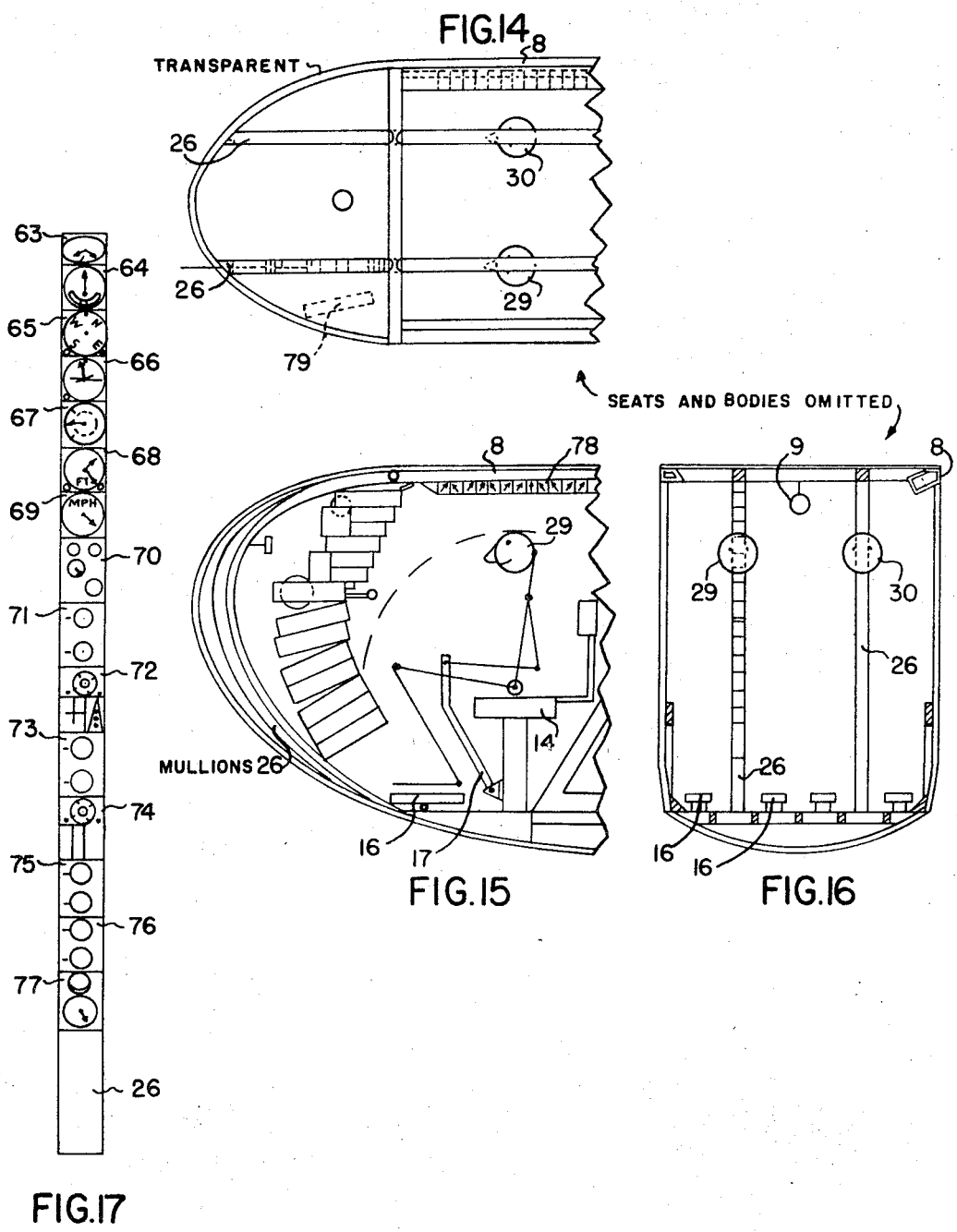

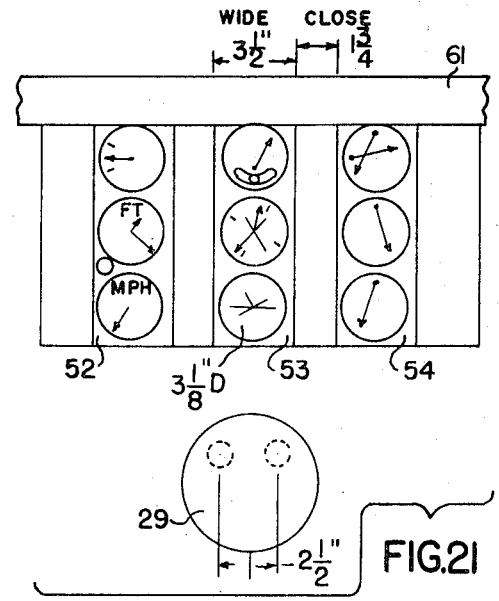
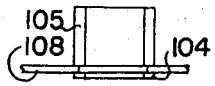
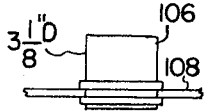
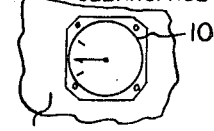
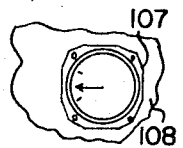
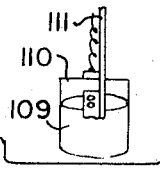
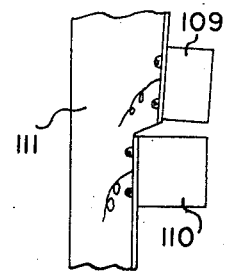
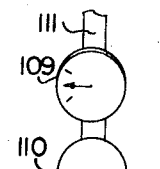
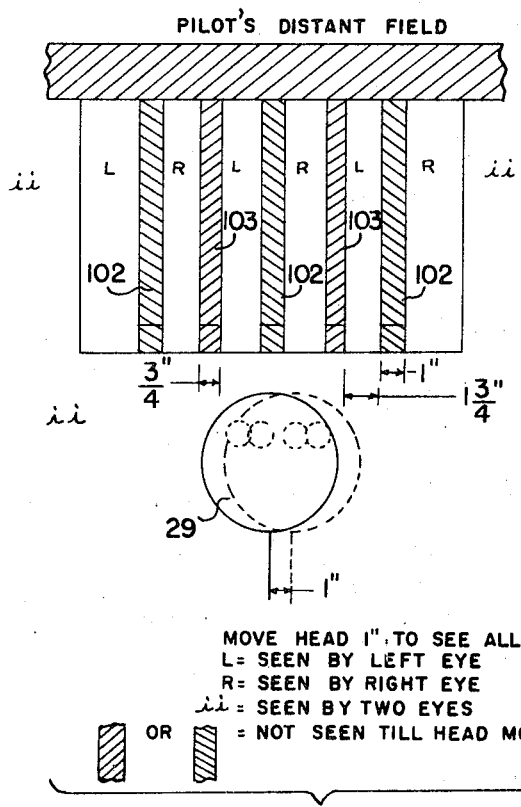
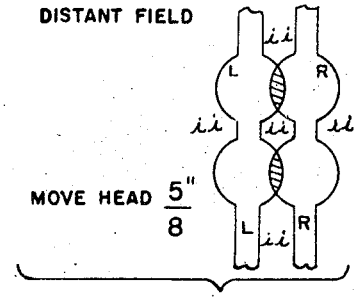

INVENTOR.
FLOYD A. FIRESTONE
BY Teare, Teare & Sammon
ATTORNEYS

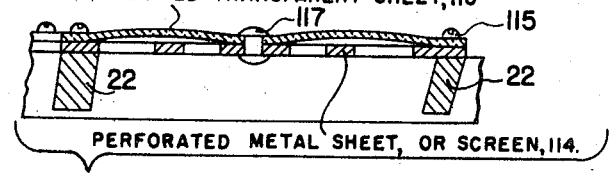
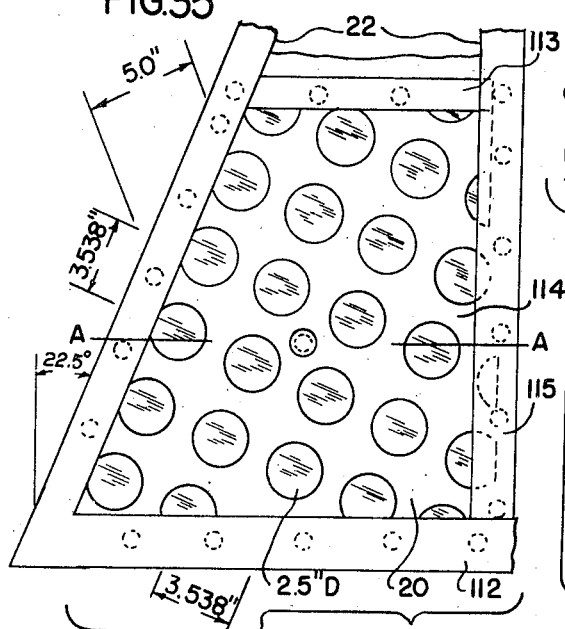
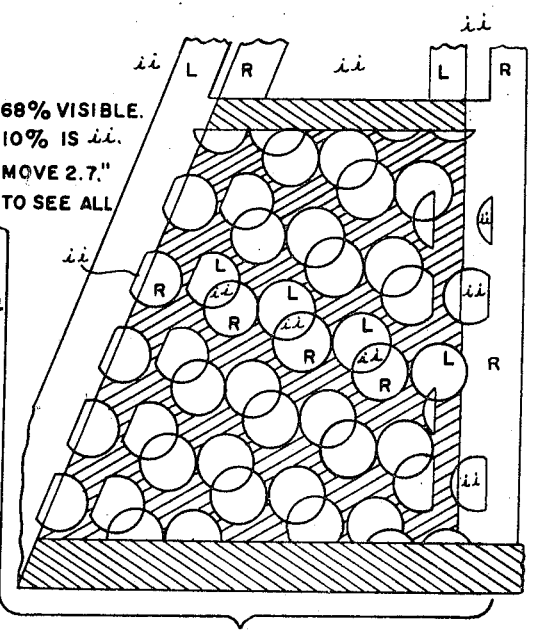
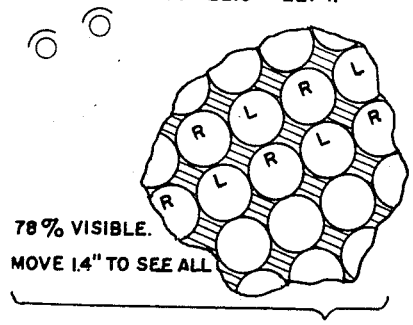
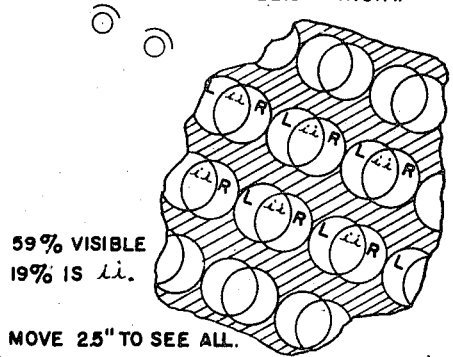
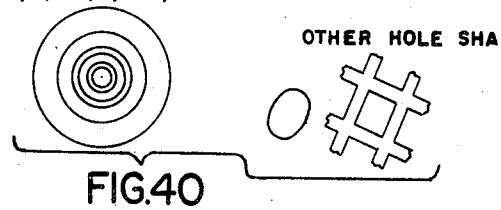

AIRPLANE WITH SPATIAL PANORAMA

CROSS-REFERENCES TO RELATED APPLICATION

The present application is a division of application for Letters Patent of the U.S. Ser. No. 806,346, now U.S. Pat. No. 3572615, filed Mar. 7, 1969 for Airplane with Spatial Panorama, which was a continuation-in-part of application Ser. No. 660,700, now abandoned, filed Aug. 15, 1967, the latter of which, in turn, was a continuation-in-part of application, Ser. No. 616,056, now abandoned, filed Feb. 14, 1967.

BACKGROUND OF THE INVENTION

Field of the Invention

This invention relates to aircraft structure and particularly to fuselage and body construction and also to the arrangement of twin aircraft power plants on the airplane.

Description of the Prior Art

On conventional airplanes the visibility of the pilot and copilot forward and downward during a takeoff is so limited both by the instrument panel and often by an engine that the runway and field boundary obstructions are invisible. Furthermore, so many steradians of solid angle surrounding the pilot are covered by opaque structures as to generate a collision hazard. Additionally, the beauty of the scene is not appreciated by either the pilot or the passengers in a conventional prior art airplane.

SUMMARY OF THE INVENTION

Briefly, the present invention contemplates placing those structures which are necessarily opaque above or behind the pilot and by making the fuselage substantially transparent, whereby the pilot and the passengers obtain a substantially unlimited and continuous view of sky and earth. In general, the continuity of the scene, as viewed by the pilot or passengers, is achieved by utilizing struts and floor grating of such size and shape as to take advantage of the fact that each observer has two eyes each of which is capable of viewing a scene separately. The foregoing result of spatial panorama in level flight is achieved by the novel combination of some of the following coacting elements:

a. A wind above the pilot's eye level.
b. Tail surfaces above eye level supported by boom(s) above eye level.
c. Motor (and preferably propeller) above eye level.
d. Instrument panel and instrument box above eye level, containing substantially all attitude and navigational instruments, radios, engine instruments and controls, and the other systems' controls.
e. Individual seats for each person on board, capable of being swiveled about a vertical axis.
f. A landing gear and floor assembly affixed to said seats and lying below the plane of the seat bottoms.
g. Aileron and elevator control column with partial wheel, mounted under and swiveling with, the pilot's seat, the wheel grips operating in spaces alongside the pilot's legs; or a control stick operating in the space between the pilot's legs with its grip about the level of the pilot's lap, and swiveling with the pilot's seat.
h. Rudder and brake pedals so placed that the pilot's toes are as far rearward as his knees when he is facing forward, so that by leaning forward about 30° the pilot can see straight down to the ground with no structures cutting off his view up to and somewhat above the horizon from port to starboard.
i. A substantially transparent fuselage nose extending from below the pilot's toes to the top of the instrument box (d above).
j. A substantially transparent window and door assembly, extending from the assembly which is above eye level (a, b, c, d, above) down to the landing gear and floor assembly (f above).
k. Opaque struts adequately spaced and properly oriented, and extending from the assembly which is above eye level (a, b, c, d, above) down to the landing gear and floor assembly (f above) each such strut having a projected width parallel to the pilot's interpupillary line when looking past the strut, less than his interpupillary distance, so that the pilot sees the entire ground scene in any direction with at least one eye at a time, and the scene consequently appears to be continuous even in the sight direction past each strut, thus taking advantage of his binocular vision.
l. A large window in the fuselage floor behind the pilot which may be protected from foot falls by a coarse grating constructed principally of narrow bars so oriented and spaced relative to the interpupillary distance that all parts of the scene below are visible in any downward direction to the passengers and swiveled pilot(s) with at least one eye each and consequently the scene appears to be continuous.
m. A window in the fuselage ceiling aft of the instrument box (d above), which enables the pilot to see where he is going in a turn.
n. An instrument panel array that the pilot can see through.
o. A stressed skin structure that the pilot can see through.

An object of my invention is to enhance the beauty of the view of the ground and sky from an enclosed fuselage, instrument equipped, fixed wing airplane as perceived by its pilot(s) and passenger(s).

A further object of my invention is to improve the safety of the enclosed fuselage, instrument equipped, fixed wing airplane during takeoff by providing the pilot(s) with a view of the runway and airport boundary ahead, even when the plane is in a nose-high takeoff attitude.

A further object of my invention is to improve the safety of the enclosed fuselage, instrument equipped, single engined, fixed wing airplane in the event of engine failure by providing the pilot(s) with a quick survey view of all ground surfaces within gliding range so that the best emergency landing field may be quickly chosen.

A further object of my invention is to improve the safety of the enclosed fuselage, instrument equipped, fixed wing airplane by decreasing the hazard of collision with other airplanes through providing the pilot(s) with increased solid angle of view; a good view downward and rearward is particularly important when making the final approach into a field whose traffic is not radio controlled.

A further object of the invention is to provide an instrument panel arrangement which is adapted for use in airplanes of substantially conventional structure, particularly when the airplane is equipped with two engines on the wings.

BRIEF DESCRIPTION OF THE DRAWINGS

Further objects of my invention will become evident upon reading the following description and consulting the drawings in which:

FIGS. 1, 2 and 3 are three views of a panoramic plane with single pusher engine mounted above the wing, embodying the features a to m of my invention mentioned above, FIG. 1 being a view from the side, FIG. 2 a view from the top with the wings clipped, and FIG. 3 a view from the front with the wings clipped. Arrows show the many directions in which the pilot has clear vision.

FIG. 12 is a plan view of a complete twin engined instrument panel arrangement that a pilot can see through, the instruments being mounted on panelettes in box units each having a "trans-sight projection" (hereinafter defined under the paragraph headed "Definitions") less than the pilot's interpupillary distance, while each unit is bounded on its left and right by transparent clear spaces each having a "trans-sight projection" greater than the pilot's interpupillary distance.

FIG. 13 is a detailed elevation of said instrument panel arrangement looking in a forward direction.

FIG. 14, 15 and 16 are respectively a broken plan, broken side elevation and section looking in a forward direction, of the nose of a single engined plane having an instrument panel arrangement having only one panelette.

FIG. 17 is a detailed larger view of the single panelette.

FIG. 21 shows three rectangular panelettes, too wide and too close for full field of vision through at a glance, but permitting full field to be perceived as shown in FIG. 22 by moving the head 1 inch.

FIGS. 23, 24, 25 and 26 show how the mounting shoulders on standard instruments of 3 ⅛ inch diameter, waste clearspace even when mounted in transparent panels.

FIGS. 27, 28 and 29 show instruments mounted in cylindrical cases of 3 ⅛ diameter and supported from the rear of the cases in order to achieve the pilot's field of distant view shown in FIG. 30.

FIGS. 35 and 36 are respectively the section and the side elevation of a portion of fuselage sidewall strengthened by a stressed skin covering that the pilot can see through.

FIG. 37 shows the resulting distant field with eyes level, FIG. 38 the distant field with eyes tipped 22.5° left, and FIG. 39 the distant field with eyes tipped 22.5° right.

FIG. 40 shows other sizes and shapes of holes that have been found to have useful visual properties in stressed skin structures.

DESCRIPTION OF THE PREFERRED EMBODIMENTS

Figure 4:
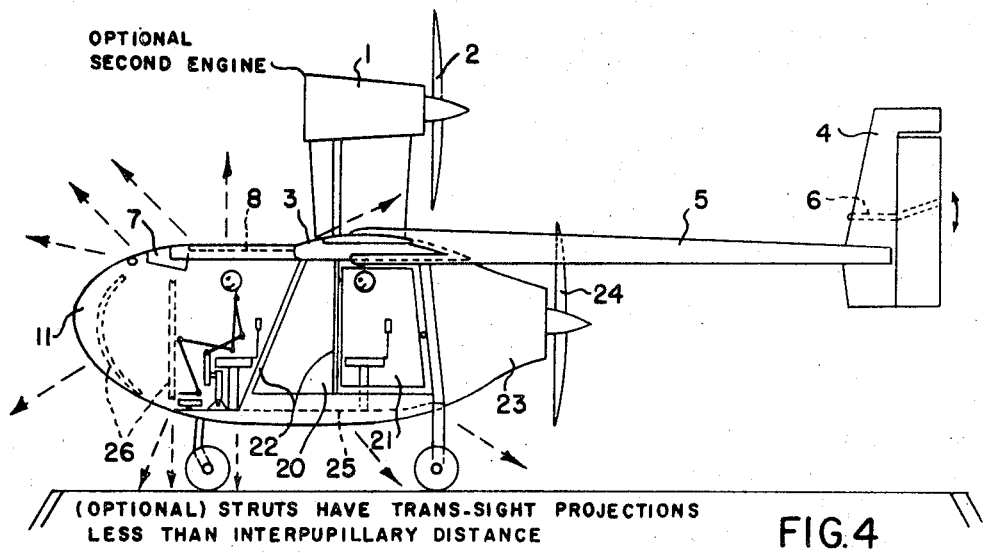
FIGS. 4 and 5 are two views of a plane with one pusher engine mounted in the rear of the fuselage, and optionally a second pusher or tractor engine mounted on top, embodying the features a to m except c of my invention mentioned above, FIG. 4 being a view from the side, and FIG. 5 a view from the top with the wings clipped. Again arrows show the many directions in which the pilot has clear vision.

My invention pertains to a fixed wing airplane which in straight and level flight permits the pilot and copilot to see the entire ground and sky in all directions and from nadir to zenith with the exception of roughly two steradians of solid angle in the quadrant above and behind him. Thus, each pilot has visibility through roughly 10.5 steradians of solid angle out of a theoretically ideal total solid angle of 12.56 steradians. Rear seat passengers have visibility somewhat exceeding but including the entire 6.28 steradians of solid angle occupied by the ground. A second embodiment further improves the pilot's visibility upward rearward at the expense of visibility rearward, while still maintaining each pilot's visibility at as much as 10 steradians. In all embodiments, the necessary opaque struts which cross the transparent areas, are so oriented and dimensioned that the distant scene as seen through the major areas of the plane appears to be continuous, advantage being taken of the fact that the pilot has two eyes whose lines of regard are not simultaneously occulted by narrow struts properly spaced and oriented. These results are achieved while providing the occupants protection from wind and weather, while providing navigation instruments and blind flying instruments for emergency use, and providing airplane controls which utilize the movements which conventional airplane pilots have already learned.

Definitions:

Where such terms of reference or orientation as "above," "below," "horizontal," "vertical" and the like, are used in the description of the structure of the airplane or in the claims, they shall have their usual meanings assuming the attitude of the airplane to be its attitude in normal cruising straight and level flight.

"Binocular vision" is the act of seeing by one person with his two eyes, and a portion of structure is designated as "transparent to the binocular vision" of a person if it permits the person, on looking through the portion of structure with both of his eyes focused on the distant scene, to perceive any part of the distant scene beyond the portion of structure with either one eye or the other, or with both eyes.

The "pilot's eye level" is defined as a horizontal plane which passes through the centers of the pupils of the pilot's eyes. In an empty plane jacked to the attitude of normal cruising straight and level flight, the "pilot's eye level" is defined as a horizontal plane approximately 31 inches above the height of the pilot's seat bottom (or the average seat bottom height if it is adjustable).

A "line of regard" is an imaginary line drawn from the center of the pupil of an eye of an observer to that portion of the distant scene whose image is formed upon the fovea centralis of his retina where his vision is most acute.

The "interpupillary distance" is the distance between the centers of the pupils of the two eyes of an observer.

The "trans-sight projection" of a portion of a structure (such as a strut, or an interspace between struts) as seen by an observer of specified position looking past that portion of structure at a distant scene, is the length of the projection of the apparent boundaries of that portion of structure upon his interpupillary line by means of lines parallel to his momentary lines of regard from his two eyes. If the trans-sight projection of an opaque portion of structure is less than the observer's interpupillary distance, that portion of structure cannot simultaneously cut off the lines of regard from the two eyes, and the distant scene will appear to be continuous in spite of the presence of the structure.

The "central axis" of an instrument of radio is a line passing through the center of area of its bounding front face or panel and perpendicular thereto.

Referring to the embodiment of FIGS. 1, 2 and 3, the propulsive means consisting of the engine 1 with pusher propeller 2, is mounted above the level of the wing 3. While the two-bladed propeller shown is advantageously cheap, the use of a 3 or 4 balded propeller or a jet would enable the propulsive means to be advantageously mounted somewhat lower while still being above the wing. Conventional tail assembly 4 having all its surfaces preferably above the level of the lower surface of the wing, is supported by the boom 5 which is affixed to the engine-wing assembly. All parts of the boom are preferably above the level of the lower surface of the wing. The tendency of this assembly to nose down when power is applied may be counteracted by proper trimming of the stabilizer 6.

Forwardly of the wing 3 is the instrument box 7 whose rearward face constitutes the instrument panel on which would be mounted (through not shown) most of the attitude and navigational instruments, radios, engine instruments and controls and the other systems' controls. Two hollow members, such as 8, may be used to support the instrument box from the wing and to contain control rods and wires; the inboard faces of members 8 may also be used for mounting small instruments or controls. Magnetic compass 9 is shown forwardly of the instrument box. Between the members 8 and extending from the instrument box 7 to the wing 3, is the ceiling window 10, which permits the pilot to see where he is going in a turn.

Below the level of the flight assembly comprising elements 1 to 10, is the substantially transparent fuselage 11 to 12, below which is the tricycle landing gear 13. The transparent material used for all the transparent surfaces (except possibly the floor) should preferably not transmit ultraviolet light which would sunburn the occupants, but it would not be an advantage for the material to absorb those wavelengths carrying the radiant heat; the great average transparency of the fuselage will prevent its interior from getting hotlike a greenhouse since most of the heat radiation entering the fuselage will pass on through it. An example of such material is polymethyl methacrylate having an invisible ultraviolet-absorbing material, such as phenyl salicylate, incorporated therein. Four seats 14 swiveling about a vertical axis are shown supported from the fuselage floor which is shown as bounded by narrow but substantial framing members 15. The pilot, occupying the left front seat, is shown schematically, but only the heads and eyes of the copilot and passengers are shown, to avoid congestion of the drawings. Four rudder pedals 16 having approximately horizontal principal surfaces are placed near the floor and at such distance ahead of the pilots' seats that the forward edges of the pedals, and hence the pilots' toes, are no farther forward than their knees. Thus by leaning forward about 30°, the pilot and copilot can see straight down through the transparent fuselage nose 11 which extends from near the tip of the rudder pedals 16 up to the forward top edge of the instrument box 7 which has been placed just far enough forward to bring its instrument panel within easy reach of the pilot and copilot. The bottom edge of the instrument panel is just a few inches above the level of the eyes of the pilot and copilot so as to permit them vision forward and somewhat upward, which upward view can be extended somewhat more upward by leaning forward.

In order to keep the aileron and elevator controls from obstructing the vision, a short control stick 17 may be used between the legs as shown for the copilot in FIG. 3, or as shown for the pilot a short control column 18 under the seat may support a large semiwheel 19 whose grips lie outside and alongside the pilot's legs; both the stick and control column may swivel with the respective seats with which they are associated.

The two passengers whose heads are shown above the rear seats can see sideward and downward through the large windows 20 which has low sills. They also see downward-forward to downward-rearward, through the floor window 25 with protective grating whose various designs are shown in FIGS. 6 to 11 and hereinafter explained. They also see rearward through the transparent entrance door(s) 21 and transparent fuselage rear portion 12.

The flight assembly comprising the upper elements 1 to 10 is connected to the gear-floor-seat assembly comprising the lower elements 13 to 19, by narrow struts such as 22 whose maximum widths and minimum spacings are limited by the following consideration:

Because of the great distance to the observed ground or sky point in comparison with the observer's interpupillary distance, the right and left lines of regard are substantially parallel within the airplane, and the spacing between them is equal to the observer's interpupillary distance when the observer's head is oriented so that he faces the observed point and his eyes are consequently directed at right angles to his interpupillary line. Thus the maximum spacing between the right and left lines of regard is equal to the observer's interpupillary distance, but the spacing may be reduced to about 0.7 of that value by directing both eyes rightward or leftward relative to the forward line of the head. The interpupillary distances of various adults range from 54 to 72 mm., which equals 2.12 to 2.84 inches, a ratio of 3 to 4. The interpupillary line is usually horizontal, though it can be inclined by tipping the head toward a shoulder. The triangle determined by the distant point being observed at the moment, and the right and left pupils of the observer's eyes, is called "a triangle of regard;" its three sides are the two lines of regard to the observed point and the interpupillary line. A triangle of regard lies in a plane called "a plane of regard" which is, of course, dependent upon the observed point and the observer's position and orientation. Many triangles of regard can lie within one plane of regard as the observer chooses to scan his attention or his eyes right or left (either with or without rotation of his head about a vertical axis) so as to perceive different observed points along the line of intersection of a plane of regard with the ground or sky scene.

Principle 1. The distant scene will appear to be continuous along the line of intersection of a chosen plane of regard with the ground or sky scene regardless of the presence of an isolated intervening opaque strut, unless the trans-sight projection of the strut exceeds the observer's interpupillary distance, so that both the right and left lines of regard to at least one point in the scene are simultaneously cut off.

Principle 2. The distant scene will appear to be continuous at right angles to the line of intersection of a chosen plane of regard with the ground or sky scene regardless of the presence of an isolated intervening opaque strut, if the scene appears continuous along the line of intersection in accordance with Principle 1 for all planes of regard at neighboring angles to the chosen plane and all including its interpupillary line.

Principle 3. Two struts may be considered as isolated wherever the minimum transparent distance between them, measured in the plane of regard at right angles to the lines of regard, exceeds all observer's interpupillary distances, namely 2.84 inches. Otherwise, the right and left lines of regard may be simultaneously cutoff by the right and left struts respectively, and thus, the scene rendered discontinuous.

Examples

A vertical strut of circular tubing less than 2.12 inches outside diameter, in front of any pilot, whose license requires that he have acceptable vision in each eye, will not break the continuity of his perception of the distant scene. If the strut of circular tubing is inclined toward the pilot's right or left, its outside diameter must be further decreased in order to retain continuity in the scene in accordance with Principle 1. A horizontal strut running from left to right, always occults part of the scene, regardless of its width, and should be avoided. If an approximately vertical strut is of irregular cross section, it is its overall dimension measured parallel to the interpupillary line (i.e., its trans-sight projection) which must be kept less than 2.12 inches in order to have continuity of perception of the scene for all pilots, in accordance with Principle 1. If the transparent windows between and adjacent to two vertical struts, measured overall parallel to the interpupillary line, are greater than 2.84 inches wide, and each strut has a trans-sight projection measured less than 2.12 inches, the distant scene will appear continuous to all pilots in accordance with Principle 3. As will be hereinafter explained in connection with FIGS. 8 and 9, by careful proportioning, continuity of scene may be achieved by using narrow struts even closer together than 2.84 inches. Further examples will be evident in FIGS. 6 to 11 where the design of floor grating is detailed.

No attempt has been made to show in FIG. 1 all the struts which anyone skilled in the art of stress analysis might deduce were needed in order to safely fasten the flight assembly (elements 1 to 10) to the gear-floor-seat assembly (elements 13 to 19). It would be advantageous to minimize the number and diameter of these struts by using the new advanced fiber composite materials of super strength to weight ratio (Fortune, Apr. 1966, p. 152). Any design should be achieved after consideration of Principles 1, 2 and 3 above. Thus in FIG. 1, the trans-sight projections of strut 22 and door jamb plus door frame 22, as viewed by the pilot, are limited to less than 2.12 inches. Those elements may simultaneously have their trans-sight projections as viewed by a passenger, limited to less than 2.12 inches.

The dotted arrows surrounding FIGS. 1, 2 and 3 illustrate the many directions in which the pilot can view the distant ground and sky scene with continuity of apparent scene. Thus he can see with continuity, all of the 12.56 steradians of scenic solid angle surrounding his head, excepting principally the solid angle behind and above him occupied by the wings, engine and tail. By leaning his body and/or swiveling his seat, the pilot can see around, above or below the instrument box, the wheels, the passengers, or the rubber pedals and floor under him. He can also see a continuous scene through the transparent floor behind him which has a protective grating designed as shown in FIGS. 6 through 11, explained later.

The safety and scenic beauty of such an airplane having spatial panorama compared with conventional airplane structures, is evident and is worthy of some sacrifice in top speed if that should be necessary.

Figure 5:
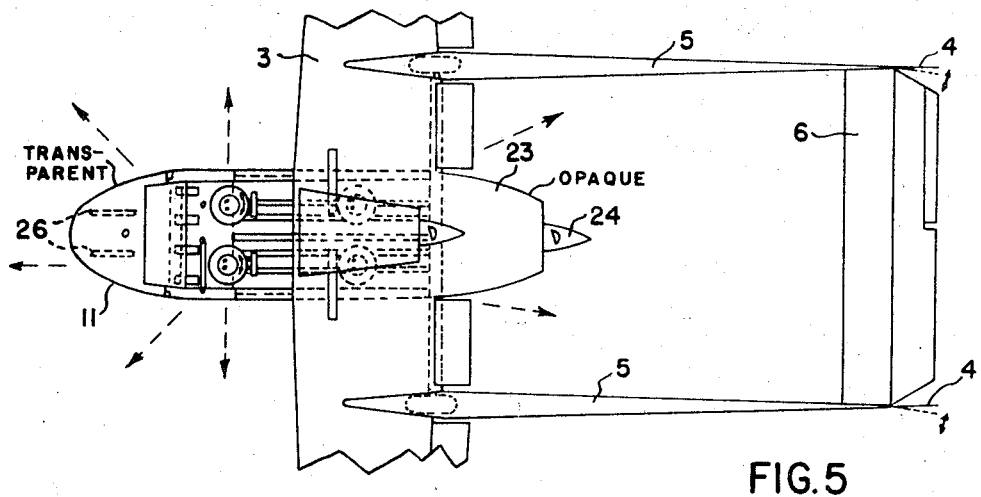

FIGS. 4 and 5 are two views of a plane with one opaque engine 23 and pusher propeller 24 mounted on the rear of the otherwise substantially transparent fuselage comprising the nose 11, side windows 20 and 21, ceiling window 8, and floor window 25. Twin booms 5 above eye level support tail fins 4 and stabilizer 6 while leaving clearance for the rotation of propeller 24. Optionally, a second engine 1 with propeller 2 may be added above the level of wing 3 if a twin-engined embodiment is desired. Struts 22 and optional additional (dotted) struts 26 again have transsight projections less than the interpupillary distances of all pilots and passengers, namely, less than 2.12 inches.

This single-engined embodiment of FIGS. 4 and 5 affords the pilot an uninterrupted panorama around the horizon except for about a 30° sector to the rear occupied by the engine 23. By some leaning forward or swiveling, the pilot can also see the entire ground and sky from zenith to nadir both fore and aft, except for a rearward opaque sector of 55°, limited by a rearward line of regard under the engine as perceived through the floor window. These bounding rear lines of regard are indicated by rearward pointing dotted arrows.

While the floor window 25 might conceivably be made of a single transparent plate, it is questionable whether such a large plate would be of adequate strength to support passengers' weight and of adequate hardness to resist the scratching of shoe soles having imbedded gravel. A practical solution is shown in plan in FIG. 6 an in section in FIG. 7, wherein the above Principles 1, 2 and 3 are applied to the design of a transparent floor which is protected from weight and scratching by footfalls by having a coarse grating superimposed upon the transparent material, said grating being so designed that the distant scene viewed through it will two eyes appears to be continuous. The heads, eyes and noses of the two forward-facing rear passengers are indicated schematically as at 27 and 28 in FIG. 6. The pilot 29 is shown facing rearward, having swiveled his seat (not shown) and neck through a total of 180°. Copilot 30 is facing forward. The grating comprises the five bars or tubes such as 31 which may be made of aluminum and which run fore and aft and are 2 inches or less in lateral dimension as marked, while the spacing between them is 3 inches or more. Behind the rear passengers is the cross section line 7–7 and this section looking forward is shown in FIG. 7 wherein 27 and 28 are the backs of the heads of the rear passengers. The cross sections of the five bars such as 31 are shown supporting the transparent window 32. Four pairs of lines of regard, 33, 34, 35 and 36 are shown radiating from the right and left eyes of rear passenger 27 as he looks forward-downward through the grating and window at the ground scene in four different directions. Pairs 34 and 35 demonstrate that no single bar will simultaneously cut off both the right and left line of regard of passenger 27, and pairs 33 and 36 demonstrate that the spacing between bars is great enough to keep any pair of bars from simultaneously cutting off any pair of lines of regard. Principles 1, 2 and 3 above have been fulfilled and the view of the ground will appear continuous to passenger 27 (and 28) over the entire surface of the widow. In the plan view, FIG. 6, regard pairs from 33 to 36 are again shown radiating from passenger 27.

Figure 6:
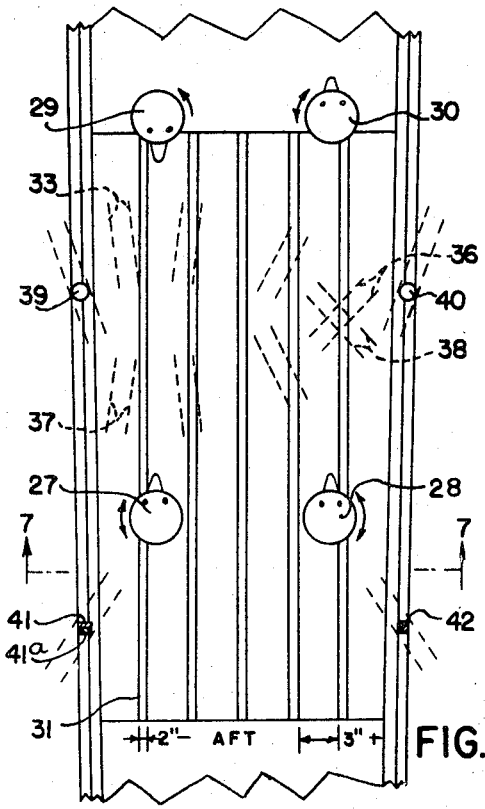
FIG. 6 is a top view of a (floor) window with protective and strengthening grating designed to afford continuity to the sight of the transparent space between bars wider than the interpupillary distance, while the projections of the opaque bars themselves are narrower than the interpupillary distance. The pilot is shown looking aft through the floor window.
Figure 7:
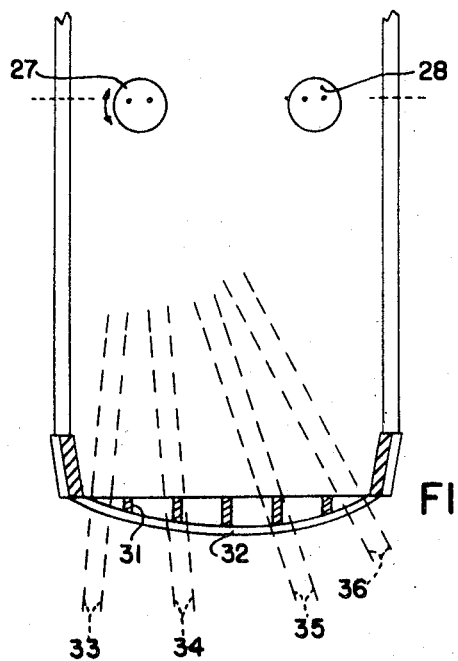
FIG. 7 is a vertical section taken on a plane indicated by the line 7—7 in FIG. 6.

Also in the plan view, FIG. 6, four pairs of lines of regard from 37 to 38 are shown radiating from swiveled pilot 29. In the vertical section, FIG. 7, those same four regard pairs are represented by 33 through 36, and again it is seen that the distant scene viewed through the floor window grating will appear continuous to the swiveled pilot 29. The same would be true for copilot 30, were he to swivel. Incidentally, vertical struts 39 and 40 of diameters less than the interpupillary distances, have pairs of lines of regard spanning them having radiated from passengers 27 and 28 respectively, who therefore have continuity of vision around the horizon in spite of these spars. The same is true for combined spar 41 and door frame 41A past which passengers 27 and 28 see a continuous scene as they look rearward.

By using care, and especially by aligning the heel-to-toe axis of the feet from port to starboard of the airplane, the passengers and pilots can walk on the grating 31 without touching the transparent window surface 32. However, by careful proportioning, it is possible to design a comparatively narrow space grating as shown in FIGS. 8 and 9 which makes carefree walking possible and at the same time enables the distant scene to be viewed through it with apparent continuity.

Figure 8:
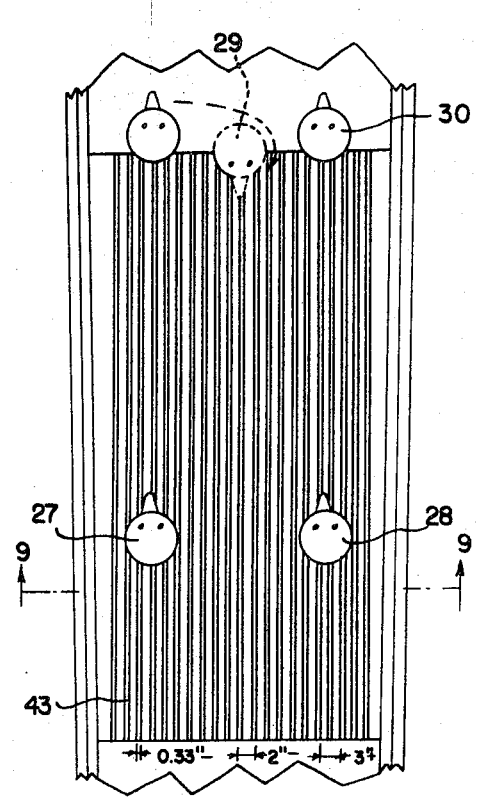
FIG. 8 is a top view of a (floor) window with protective and strengthening grating designed to afford continuity to the scene viewed through it by having the projection across the line of sight of two transparent spaces plus one opaque bar wider than the interpupillary distance, while the projection of two opaque bars plus one transparent space is narrower than the interpupillary distance.

In the plan view of FIG. 8, each fore to aft grating bar 43 is shown as of lateral dimension of 0.33 inches or less, while the summed lateral dimension of two bars plus one clear space between them is 2.0 inches or less as shown, and simultaneously the sum of two clear spaces plus one bar is 3.0 inches or more as shown. (This is the same as saying that the clear space varies from 1.33 up to 2.0 inches as the bar lateral dimension decreases from 0.33 inches toward zero.) In the sectional view of FIG. 9, it is seen that the bars are preferably tipped slightly so that the planes of their faces all pass through a fore and aft line in the center of the fuselage at the level of the pilot's eyes (though this slight tipping is not portrayed in the plan view of FIG. 8 in order not to further complicate the drawing). Thus, if as pilot 29 swivels to look downward-rearward through the floor window, he leans to the central plane of the fuselage, then only the edges of all the grating bars will be visible to him as he focuses on the distant ground. This will be true of any other occupant of the airplane if he leans to the central plane. Furthermore, FIG. 9 shows regard line pairs 44 through 47 radiating from swiveled and leaning pilot 29. Pairs 45 and 47 show that two adjacent bars plus their interspace cannot simultaneously cut off both the right and left lines of regard, while 44 and 46 which embrace a single bar and two spaces will never have both regard lines of the pair simultaneously cut off.

It results that all parts of the ground scene viewed through the grating will appear continuous to all occupants. If the vertical dimension of the grating bars is not too large, consistent with adequate strength, the tipping of the bars or the leaning of the occupants to the central plane becomes of minor importance, and only the bar lateral dimension and spacing remain critical. In any proper design of gratings or struts, the narrower bars or struts across the line of sight, the less conspicuous they will be, but adequate strength requires adequate lateral dimension.

Figure 9:
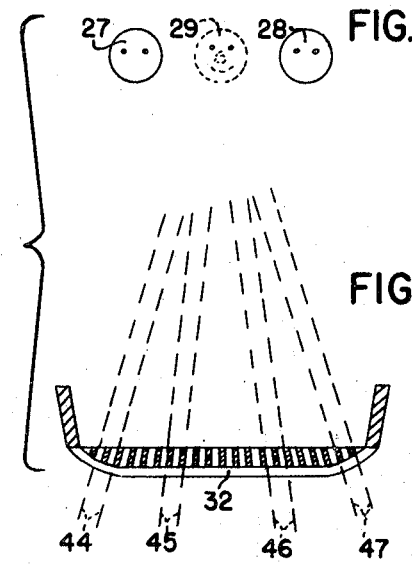
FIG. 9 is a vertical section taken on a plane indicated by the line 9—9 in FIG. 8.

Since the clear space in the grating of FIGS. 8 and 9 is less than 2.0 inches wide, carefree walking on the grating will not damage the transparent window material 32; nevertheless, the scene viewed through the floor window will appear continuous to all occupants with normal binocular vision.

Figure 10:
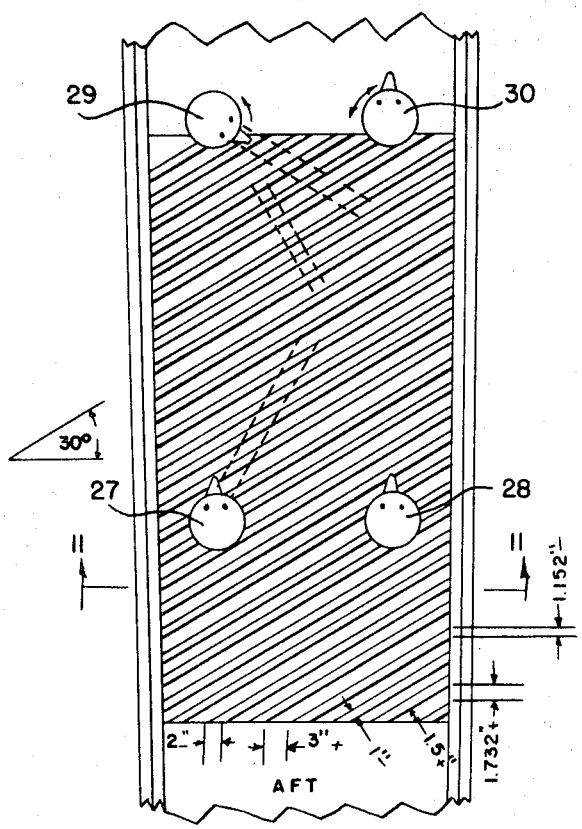
FIG. 10 is a top view of a (floor) window with protective and strengthening grating designed to afford continuity to the scene viewed through it, having the length of the opaque bars at an angle of 30° to the port-starboard line so that with transparent spaces as narrow as 1.5 inches measured at right angles to the bars, the transparent spaces measured from port to starboard shall exceed 3 inches, being greater than the interpupillary distance, while with bars as wide as 1 inch at right angles to their length the port to starboard width of the bars is 2 inches, being less than the interpupillary distance, so that the rear passengers or a partially swiveled pilot are afforded a view of the scene below which is continuous.
Figure 11:
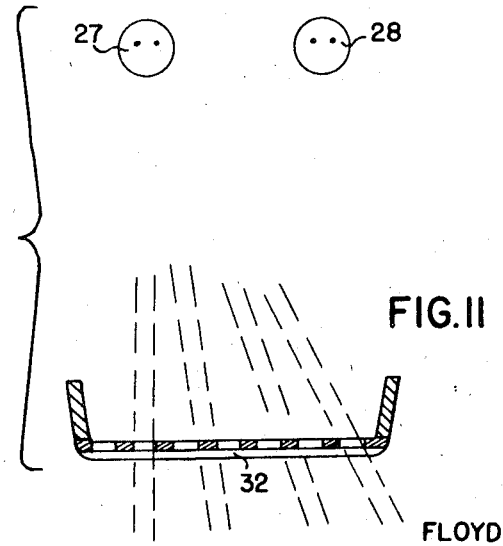
FIG. 11 is a vertical section taken on a plane indicated by the line 11—11 in FIG. 10.

An additional design of grating which yields continuity of scene while permitting a clear space as narrow as 1.5 inches is shown in FIGS. 10 and 11, wherein the direction of the length of the bars is at 30° counterclockwise from the port-starboard line of the airplane. Bars of width 1.0 inches or less as shown with clear spaces between of 1.5 inches or more, as shown, run across the floor at an angle of 30° to the port-starboard line of the airplane. Since the interpupillary line of passenger 27 is parallel to the port-starboard line, as shown at the bottom of FIG. 10, the effective width of the bars is 2.0 inches or less, as shown, and the effective width of the clear spaces is 3.0 inches or more, as marked. This grating is therefore optically equivalent to the one of FIGS. 7 and 8, and it yields a continuous view of the ground for the same reason. Because of its narrow clear space, it is still more protective of the clear window 32 from footfalls. Partially swiveled pilot 29 can see a continuous view through part of this grating as shown, or if he swivels through a full 180° he can see a continuous view through substantially the entire grating as does passenger 27.

Instrument Boxes and Panels That The Pilot Can See Through.

The same above Principles 1, 2 and 3 can be applied to the design of the instrument panel and box 7 itself to yield an instrument panel array through which the pilot can at will see, within the solid angle defined by the midinterpupillary point of his head and his instrument panel boundaries, either the continuous distant scene or his instruments, merely by changing the convergence and focus of his eyes. FIGS. 12 and 13 show the plan and elevation, respectively, of a detailed layout of such a transparent instrument array suitable for twin engines, complete blind flying and radio equipment, and overhead mounting in the position of instrument box 7 of FIG. 1, although it could be mounted at approximately the level of the pilot's abdomen.

The whole instrument box volume and instrument panel area is divided into a multiplicity of small instrument box units 51 to 58 inclusive, each with its own panelette facing in the general direction of the pilot's head 29. The trans-sight projection of each box unit and panelette as seen by the pilot 29 is made less than the pilot's interpupillary distance by making it 2.12 inches or less, and the trans-sight projection of each clearspace between units as seen by the pilot 29 is made greater than the pilot's interpupillary distance by making it 2.85 inches or more. To aid the designer in achieving these dimensions, two circles 80 and 81 with diameters scaled to correspond to 2.12 and 2.85 inches, respectively, have been drawn concentric with the head of pilot 29 in the plan view FIG. 12. The design starts from unit 53 of width 2.12 inches, height 9.5 inches and depth approximately 10.5 inches, which carries the three gyro instruments (bank and turn, gyro compass, and gyro horizon) whose proper functioning require that they be mounted in a vertical panelette whose plane is at right angles to the line of flight, thus, unit 53 is ahead of (and above) the pilot and lies between two vertical fore-and-aft planes tangent to the left and right arcs of the 2.21 inches circle 80. Unit 54 just right of 53 is then located by establishing a 53 to 54 clearspace of trans-sight projection 2.85 inches by locating a pair of parallel lines 59 tangent to the 2.85 inches circle 81 with the left line just touching the right edge of panelette 53 and the right line then locating the lateral position of the left edge of panelette 54 which is then place at a convenient distance from the pilot's head. Unit 54 then lies between two parallel lines 60 tangent to the 2.12 inches circle.

This process is applied successively to the location of all the units to the right and to the left of unit 53. The units are supported by and connected through hollow cross tube 61 which is connected to and supported from the wing 3 by hollow members 8, all of which have vertical dimensions of roughly 2 inches so the pilot can see over and under them by raising or lowering his head slightly. For simplicity, each panelette is shown here as vertical, though all but 53 could be tipped somewhat to more squarely face the pilot's head. Alternatively, the tops of the units and panelettes may be placed at the approximate level of the pilot's abdomen or knees, and the units are then preferably individually supported and connected from below by the front edge of the fuselage floor, the member 61 being omitted.

In order to demonstrate that a complete instrument array can be achieved even though more than half of the superficial panel area and instrument box volume is devoted to clearspace, there is set forth below a top-to-bottom description of each unit and panelette, 51 to 58 inclusive. This takes advantage of the miniaturized transistorized aviation radios (Regency Avionics, Indianapolis, Ind.) which when placed on edge come in modules of width 1⅞ inches, height 3⅛ inches and depth 11½ inches, so that three modules will mount within one of the above unit boxes.

A description of Panelettes and Units from top to bottom of FIG. 13 is as follows:

51. Voltmeter, Ammeter with switch, Fuel gauges for Right Tank, Right Auxiliary Tank, Left Tank, and Left Auxiliary Tank.

52. Air Temperature (which influences the readings of the instruments below it), Rate of Climb, Altimeter with Setting and Altitude Setting of Autopilot (on rear of unit,) Airspeed.

53. Clock with Setting, Bank and Turn with Engage and Turn of Autopilot (on rear of unit), Gyro Compass with Setting and Superimposed VOR and ADF indicators, Course Setting of Autopilot, Gyro Horizon with Setting.

54. Communication Receiver Number 1, Navigation Receiver Number 1, VOR Course Selector, To-FROM Lights, Runway Localizer and Glide Path Indicator (glide path receiver in Com 1), Marker Beacon Receiver Lights (marker beacon receiver in Com 2).

55. Transponder; Two Engine mixture Controls, one above the other, and both to the right of a Twin Fuel Flow Meter having roughly horizontal semicircular scales; Two Propeller Pitch Controls, one above the other, and both to the left of a Twin Tachometer having roughly horizontal semicircular scales with their zeros on the left, so that in the event of one engine failing, its low r.p.m. will cause its tachometer needle to point to that Propeller Pitch Control which the pilot should now set in the Feathered position; Two Throttle Controls, one above the other, and both to the right of a Twin Manifold Pressure Gauge having roughly horizontal semicircular scales; (controls are connected to engines through flexible cables, not shown). At rear of unit, Elevator Trim with Indicator, Master Switch, Flap Switch and Flap Position Indicator, Landing Light Switch, and Cowl Flaps' Switches.

56. Communication Receiver Number 2, Navigation Receiver Number 2, VOR Intercept Selector, To-Form Lights, VOR Indicator.

57. Transmitter Selector and Audio Switch Console, Automatic Direction Finder (ADF), Distance Measuring Equipment (DME).

58. Upper Engine: Cylinder Temperature, Oil Pressure, Oil Temperature. Lower Engine: Cylinder Temperature, Oil Pressure, Oil Temperature.

Above and behind the swiveling pilot 29 on the leading edge of the wing inside (not shown), is ample room for a rear panel carrying the controls which are seldom used, such as—Circuit Breakers, Fuel Selectors, Ignition Switches, Hobbs Meter, and Switches for Navigation Lights, Panel Lights, Pitot Heat, etc.

When the eyes of pilot 29 are focused for infinity with his lines of regard parallel and at least one line of regard always passing through a clearspace beside an instrument unit, he sees a continuous distant scene or other airplane, while in order to see an instrument he focuses and converges his eyes upon it in the natural manner. The copilot 30 can operate the controls or read the instruments, though this instrument array appears principally opaque to him, but he can see under and over it by leaning forward and backward as if he had the opaque instrument box 7 of FIG. 1. As an alternative, the four units 51, 52, 53 and 54 could face the pilot 29 as shown, while the other four units 55, 56, 57 and 58 could face the copilot 30; pilot 29 would then watch for port traffic while copilot 30 watched for starboard traffic.

If desirable, the entire instrument array with its interstitial clearspaces could be mounted at the level of the pilot's abdomen or knees. Again, if each panelette is made higher or radio units omitted, there would not have to be as many panelettes as eight. In fact, an adequate instrument and control array for a single engine airplane capable of blind flight, but under visual flight conditions showing the pilot a continuous scene from nadir to zenith and port to starboard, can be achieved with only one panelette 2.12 inches wide which extends from above eye level down to approximately foot level.

The placement of a single panelette instrument array in the airplane is shown in broken plan in FIG. 14, in broken elevation in FIG. 15, in section looking forward in FIG. 16, and in larger detail in FIG. 17. Both the instrument boxes and the mullion 26 (first shown on FIG. 4) which supports the transparent plastic, lie between two vertical planes 2.12 inches apart which include the center of the head of pilot 29 midway between them. Mullion 26 can serve both as mechanical support and connecting conduit for the instrument boxes. The panelette conforms roughly to the curvature of the plane's nose in order to permit the pilot to lean forward to look straight down. The throttle and other engine controls are near the center of the array. Control stick 17 swivels with the pilot's seat 14. The pilot's feet are normally on the rudder pedal 16 which straddle the bounding planes of the left mullion 26 and the panelette.

Referring to FIG. 17, the panelette is described from top to bottom as follows: 63 Clock; 64 Bank and Turn with Engage and Turn of Autopilot (on rear of unit); 65 Gyro Compass with Setting and superimposed VOR and ADF Indicators, Course Setting of Autopilot; 66 Gyro Horizon with Setting; 67 Rate of Climb; 68 Altimeter with Setting, and Altitude Setting of Autopilot (on rear of unit); 69 Airspeed; 70 Carburetor Heat, Mixture and Throttle; 71 Navigation Receiver Number 1; 72 VOR Course Selector, To-From Lights, Runway Localizer and Glide Path Indicator (Glide Path Receiver in Com 1), Marker Beacon Receiver Lights (Marker Beacon Receiver in Com 2); 73 Navigation Receiver 2; 74 VOR Intercept Selector, To-From Lights, VOR Indicator; 75 Communications Receiver Number 1; 76 Communications Receiver Number 2; (Transmitter Remote Mounted in Wing, now shown); 77 Distance Measuring Equipment DME.

Electrical, fuel and engine instruments 78 are mounted on the inner face of the right support 8. Again, above and behind the swiveling pilot 29 on the leading edge of the wing inside (not shown), is a rear panel supporting the controls which are seldom used, such as—Circuit Breakers, Fuel Selectors, Ignition Switches, Hobbs Meter, and Switches for Navigation Lights, Panel Lights, Pilot Heat, etc.

When the eyes of pilot 29 are focused for infinity with his lines of regard parallel and at least one line of regard always passing through the clearspace to the left or right of the panelette, he sees a continuous distant scene or other airplane anywhere from port to starboard or nadir to zenith, while in order to see an instrument he focuses and converges his eyes upon it in the natural manner. The copilot 30 has a mullion 26 of width 2.12 inches ahead of him, but no instruments; to him the instrument array appears opaque, but he can see ahead and behind it by leaning forward or back about 10 inches. He can read and operate the instruments and controls that are ahead of the pilot.

It two engines are to be used, additional instruments on other panelettes may be mounted to the left or right of the main one, as shown dotted at 79 in FIG. 14.

While a panelette would usually be designed as shown to hold the central axes of several instruments in a single vertical plane, considerable lateral displacement of individual instruments from that ideal placement is tolerable without loss of continuity of the distant scene provided that each part of the panelette still has a trans-sight projection less than the pilot's interpupillary distance and is bounded on both sides by clearspaces of trans-sight projections each greater than the pilot's interpupillary distance. Or individual instruments each having a trans-sight projection less than the pilot's interpupillary distance could be supported in a checkerboard pattern with intervening clearspaces to the left and right of each instrument, each having a trans-sight projection as seen by the pilot greater than the pilot's interpupillary distance.

While the viewing of a completely continuous scene requires instruments of smaller diameter than the pilot's interpupillary distance (2.12 inches to 2.85 inches), a good approximation to a continuous scene can be achieved with instruments of the usual 3⅛ inches diameter provided that the individual instruments are bounded on their left and right sides by transparent clearspaces of trans-sight projections as seen by the pilot each greater than the pilot's interpupillary distance.

If the pilot uses spectacles and does not have sufficient accommodation to focus on the distant scene and then on the instruments, his spectacles should have a segment with 1.5 diopters "add" in their upper part for reading the high instruments, as well as the usual segment in their lower part for reading the lower instruments and the map.

Figures 18, 19:
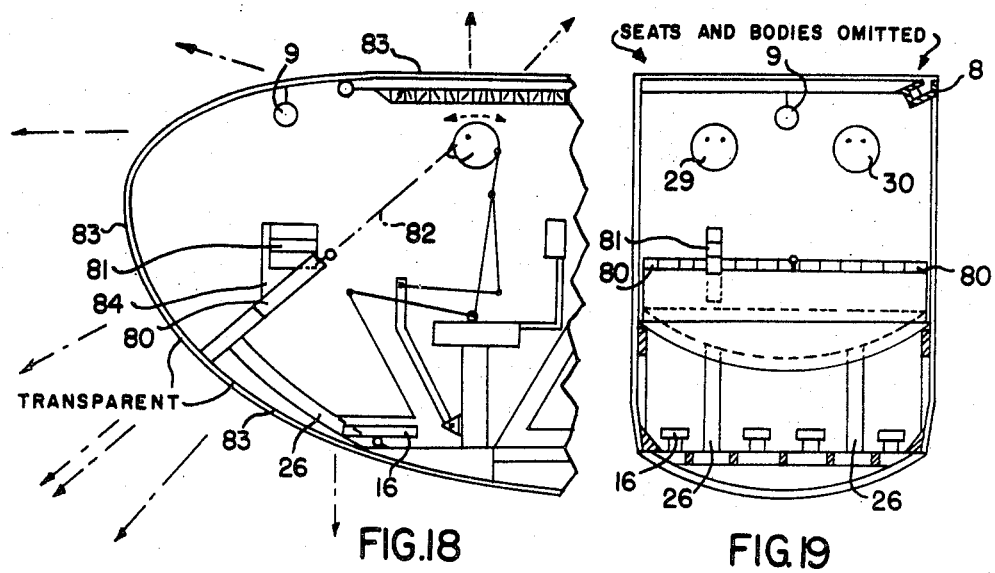
FIGS. 18 and 19 are respectively the broken side elevation, and section looking forward, of the nose of an aircraft having an instrument panel array that the pilot can see through and past comprising, between the pilot and the large windows ahead of him, two intersecting panelettes, namely, a lateral panelette and a vertical panelette.

The same principles 1, 2 and 3 can be applied to the design of another type of instrument panel array that the pilot can see through and past, as shown respectively in the broken side elevation of the aircraft's nose in FIG. 18, and in section looking forward in FIG. 19 (the seats and pilot's bodies being here omitted for clarity). This instrument array consists of two intersecting panelettes, 80 and 81.

The lateral panelette 80 consists of a multiplicity of instruments arranged side by side with their face centers along a single lateral line and with the instruments preferably contained between two parallel planes. As shown, the pilot 29 looks downward about 40° to see the faces of these instruments 80 whose faces are somewhat ahead of and somewhat above his knees. The containing planes also slope downward at 40°, the central axes 82 of the individual instruments sloping upward at 40° so that they intersect the pilot's interpupillary line or its extension. The slop angle of 40° is subject to much choice by the aircraft designer, the principal condition being that the central axes 82 of the individual instruments 80 should be oriented to substantially intersect the pilot's interpupillary line or its extension in order that the instruments shall occult a minimum amount of the distant scene. The pilot can see the full downward distant scene past the instruments 80 by leaning forward and back about 3 inches, or turning his head toward a shoulder. Also by leaning forward, he can see straight down to the nadir. The arrows surrounding FIG. 18 show some of the directions in which the pilot can see the distant scene.

As a variation, the lateral panelette 80 might be placed above the pilot's eye level, approximately at the position of compass 9, the central axes 82 of the individual instruments 80 again being oriented to substantially intersect the pilot's interpupillary line or its extension.

The lateral panelette 80 is placed between the pilot and a window 83 ahead of him which preferably extends from his toes upward to above and behind him and which should have such narrow mullions designed in accordance with principles 1, 2 and 3 as are necessary for strength of the window. Thus, the panelette 80 shades the lower portion of the window 83 and its lower edge may brace the window. The upper and lower principal faces of panelette 80 are preferably painted dull black to minimize window reflections. Mullions 26, which also brace the lower window 83 may be used to support the panelette 80 and to carry connections to other portions of the aircraft Mullions 26 have trans-sight projections as seen by the pilot, less than the pilot's interpupillary distance.

The vertical panelette 81 accommodates one or more gyro instruments which require a vertical panel for their proper functioning. The instruments of the vertical panelette 81 are preferably contained between two vertical planes 2.12 inches apart, though larger instruments may be used if desired. The central axes of these instruments must point rearward along the line of flight and should preferably lie in a vertical plane passing forward through the pilot's head. If the trans-sight projection of the upper portion of the vertical panelette 81 is less than 2.12 inches and it is bounded on both its left and right by clearspaces having trans-sight projections greater than 2.85 inches, the distant scene will be continuous as seen by the pilot past it. If the trans-sight projection of the upper portion of the vertical panelette is greater than 2.85 inches and it has some clearspace on its right and left, the distant scene can still be perceived if the pilot moves his head sideward, as will be elaborated below. The autopilot 84 is affixed to the front of panelette 81 so that its controls shall be associated with those gyro instruments whose readings they affect.

Figure 20:
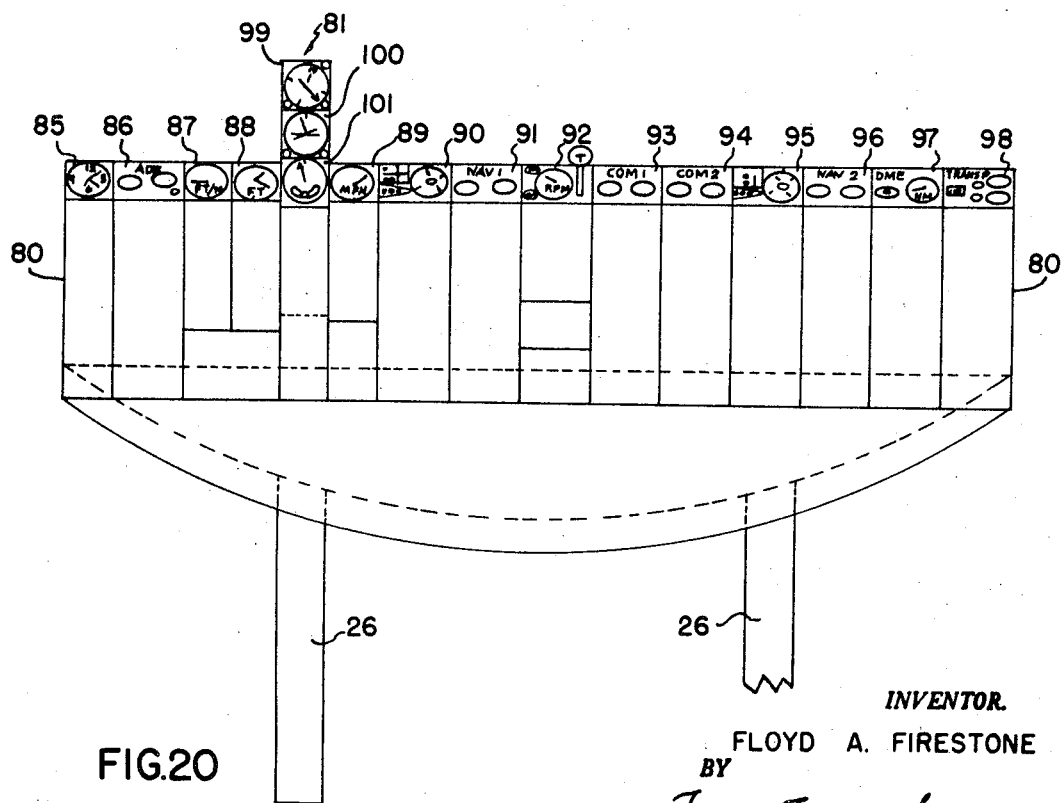
FIG. 20 is a detailed elevation of said instrument panel array looking forward, showing the mullions 26 which support the array and contain the connections which lead to other parts of the aircraft.

Referring to FIG. 20, a typical lateral panelette 80 for a single engine aircraft is described in detail from left to right as follows: 85 Clock; 86 Automatic Direction Finder (ADF); 87 Rate of Climb; 88 Altimeter; 89 Airspeed; 90 VOR 1 Course Selector, To-From Lights, Runway Localizer and Glide Path Indicator, and Marker Beacon Lights; 91 Navigation Receiver Number 1; 92 Throttle, Tachometer, Mixture, Heat, (not shown are stabilizer, flap controls, landing light switches, etc.,); 93 Communications Receiver Number 1; 94 Communications Receiver Number 2; 95 VOR Intercept Selector, To-from Lights, VOR Indicator; 96 Navigation Receiver Number 2; 97 Distance Measuring Equipment; and 98 Transponder.

Still referring to FIG. 20, a typical vertical panelette 81 of gyro instruments is described in detail from top to bottom as follows: 99 Gyro Compass with Setting and Superimposed ADF Indicator, Engage and Course Setting of Autopilot; 100 Gyro Horizon with Setting and Autopilot Turn; and 101 Bank and Turn Indicator. Instrument Arrays Through Which the Pilot Can See the Whole Scene Bounded by the Array, by Small Motions of His Head.

The instrument arrays described above with reference to FIGS. 12 and 13 (including their low level embodiments) and FIGS. 15, 16 and 17, were designed in accordance with Principles 1, 2 and 3 to give the pilot a view of the entire scene bounded by the array or bounding the array, at a single glance with at least one of his eyes and without the necessity of moving his head. However, useful arrays can be constructed which violate Principles 1, 2 or 3 and consequently give the pilot a view of only part of the scene at a glance but enable him to see the remainder of the scene by small motions of his head. In some violating arrays, by taking advantage of the fact that the pilot has two eyes which are capable of individually perceiving a scene, the head motion required in order to perceive all of the bounded scene may be of the order of only an inch.

Thus by assuming that the pilot will make small motions of his head, it is possible to utilize in an array, presently available instruments of diameters or widths too large to satisfy Principles 1 and 2, and/or instruments so compactly spaced that the clearspaces between them fail to satisfy Principle 3.

For example, in the instrument arrays described with reference to FIGS. 12 and 13 (including their low level embodiments), if each panelette has a trans-sight projection of 3½ inches while the pilot's interpupillary distance is 2½ inches (the trans-sight projection of the clearspaces being 3 inches), when this pilot looks at the distant scene there will appear to be centered upon each panelette an opaque vertical stripe not seen by either eye and 1.0 inch wide (panelette width minus interpupillary distance) which occults 1/6.5 of the distant scene; by moving his head sideward 1.0 inch, all of these opaque stripes will appear to move sideward relative to the scene, and the previously unseen portions of the scene will be brought into view, and in their apparent rational attachment to the remainder of the scene.

As a further example with reference to FIGS. 12 and 13, suppose now that each panelette has a trans-sight projection of only 2⅛ inches, that the pilot's interpupillary distance is 2½ inches, but that each clearspace has a trans-sight projection of only 1¾ inches. Now when this pilot looks at the distant scene through the array, there will appear to be centered upon each clearspace an opaque vertical stripe not seen by either eye and ¾ inches wide (interpupillary distance minus clearspace width) which now occults 0.75/3.87 of the distant scene; by moving his head sideward ¾ inches, all of these opaque stripes will appear to move sideward relative to the scene, and the previously unseen portions of the scene will be brought into view, and in their apparent rational attachment to the remainder of the scene.

As a further example with reference to an array of the type shown in FIGS. 12 and 13, suppose now that both of the violations of the above two paragraphs exist simultaneously as shown in FIG. 21. Each panelette 52, 53 and 54 has a trans-sight projection of 3½ inches, each clearspace has a trans-sight projection of only 1¾ inches, and the pilot's interpupillary distance is 2½ inches. Now when this pilot looks at the distant scene through the array, as shown in FIG. 22 there will appear to be centered upon each panelette an opaque vertical stripe 102 which is 1.0 inch wide, and there will appear to be centered upon each clearspace an opaque vertical stripe 103 which is ¾ inches wide, both of these types of stripes occulting 1.75/5.25 of the distant scene. By moving his head sideward 1.0 inch, all of these opaque stripes will appear to the pilot to move sideward relative to the scene, and the previously unseen portions of the scene will be brought into view, and in their apparent rational attachment to the remainder of the scene.

Most navigational and radio indicating instruments which are presently available are of standardized dimensions for mounting in a panel hole of 3⅛ inches diameter. As shown in FIGS. 23 and 24 these having mounting shoulders 104 and cases 105 whose section is a square somewhat larger than 3⅛ inches across but with beveled corners, or as shown in FIGS. 25 and 26 the case 106 is a cylinder 3⅛ inches across but with double beveled corners. Even when these instruments are mounted in a transparent instrument panel 108 as shown in those figures, the opaque mounting shoulders are wasteful of the pilot's clearspace, the instruments appearing somewhat larger than their mechanism requires.

Additionally, I propose that, as shown in FIGS. 27, 28 and 29, the mechanism of the standard available instruments be encased in cylindrical cases such as 109 and 110 whose ends farthest from the pilot are affixed to a supporting member such as 111 whose width is considerably less than the pilot's interpupillary distance, say 1 inch as shown. Such a supporting member cuts off no distant view on account of its narrowness and the presence of clearspaces on both sides of it, also much of it is hidden behind the instruments. The supporting member can accommodate instruments of different lengths and can tilt them to face the pilot, as shown in FIGS. 29.

The resulting distant field as seen by the pilot when he looks past instruments 109 and 110 is as shown in FIG. 30, the entire field being visible with either the L or R eyes or both eyes (ii), with the exception of a cross-hatched double segment of maximum width ⅝-inch (instrument diameter minus pilot's interpupillary distance of 2.5 inches) which appears to lie on the center of each instrument. By moving his head sideward ⅝-inch, the pilot can see these remaining bits which are occulted. The use of such rear mounted instruments of 3⅛ inch diameter would thus be very practical in the vertical array of FIG. 17 in the event that instruments of 2⅛ inch width are not available. Of course, standard instruments of 3⅛ diameter and with their mounting shoulders of 3¼ inch width, can be used in the array of FIG. 17, but said pilot would then have to move his head ¾ inch to see all.

In FIG. 30, the area of the occulted double segment of central width $w$ formed by the overlapping of two circles of equal radii $R$, one not seen by the right eye and the other not seen by the left eye, can be computed from the formula:

$$\text{Area}_{\text{(dbl seg)}} = [2R^2 \cdot \cos^{-1}_{\text{radians}} (R-w/2)/R] - (2R-w)\sqrt{Rw-w^2/4}.$$

This formula was deduced from the area of a single segment of a circle given on page 17 of Hudson's "Engineer's Manual," Wiley 1917. The above formula was used in computing the percentages of area visible in the embodiments described below.)

In a complex airplane the designer may be hard pressed to find any area within the instrument array to devote to clearspace and he may strive to make his array as compact as possible. By using back mounted cylindrical cases on the instruments, a surprising amount of clearspace can be achieved even with quite compact arrangements, and the pilot can see the remainder of the distant scene through the array by slight movements of his head.

Figure 31:
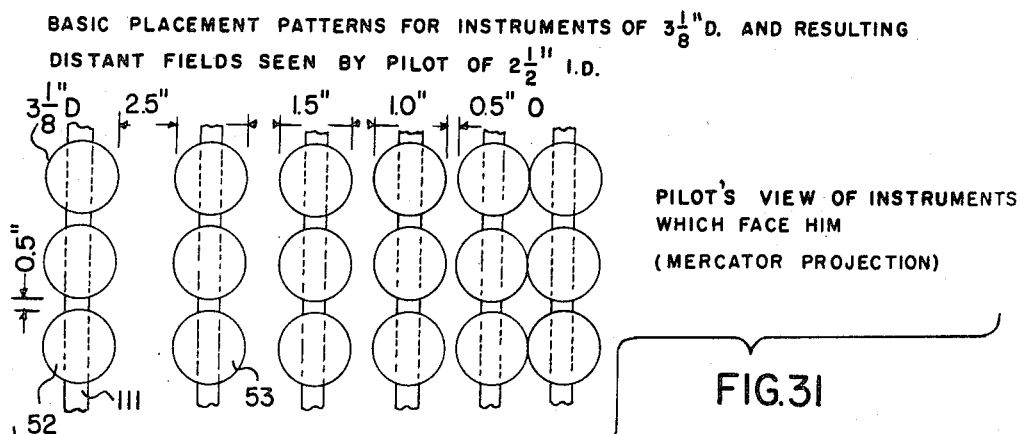
FIG. 31 shows rear supported cylindrical instruments 3 ⅛ inches diameter in groups of three and with diminishing clearances as marked.

In order to determine the distant field seen by the pilot through an instrument array of the general type described above with reference to FIGS. 12 and 13 (including their low level embodiments) but having each panelette replaced by a column of rear mounted instruments in cylindrical cases, FIG. 31 has been drawn. Here each "panelette" 52, 53, etc., consists of a column of three rear mounted cylindrical instruments each of diameter 3⅛ inches and each with its central axis passing through the pilot's head so that it appears to him to be an opaque circle. A vertical clearance of 0.5 inches is provided between adjacent instruments in each column, as shown. In order to demonstrate the influence of various horizontal clearances between adjacent columns, upon the resulting distant field of view, different horizontal clearances have been drawn to scale representing 2.5, 1.5, 1.0, 0.5 and 0 inches, as shown.

Figure 32:
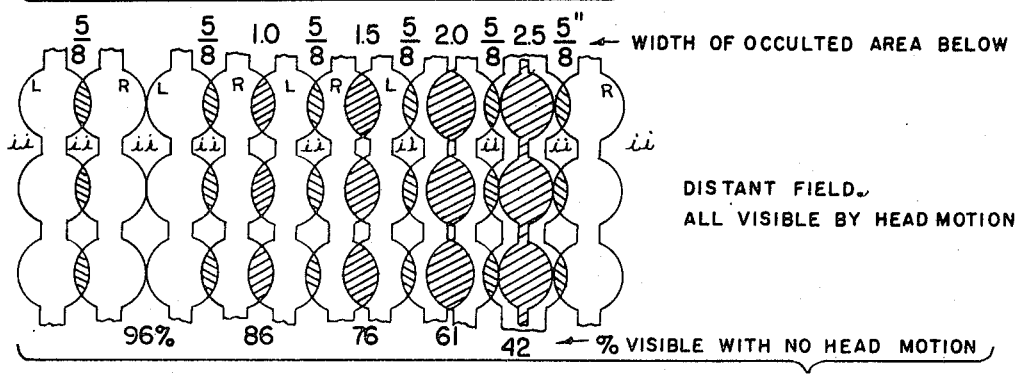
FIG. 32 shows the resulting pilot's filed of distant view.

FIG. 32 shows the resulting distant field of view when the pilot diverges his eyes and focuses upon the distant scene. Regardless of the clearance between columns, an occulted double segment of maximum width ⅝ inch appears to lie on the center of each instrument, but the pilot can avoid their combined effects upon his field of view by moving his head sideward at least ⅝ inch. Also above and below each instrument there appears to be a hole 1.5 inches wide (half of those which are marked ii) through which the pilot can see with both eyes simultaneously for identifying distant objects with greatest acuity. Another series of such ii holes lies upon the wide portions of the clearspaces, but they grow narrower as the horizontal clearance between instruments is reduced.

If the array is made up of columns having horizontal clearances of 2.5 inches, the pilot will be able to see 96 percent of the distant scene at a glance (see bottom of FIG. 32); no occulted area appears to lie upon the clearspaces. If the horizontal clearances are made 1.5 inches, there appears to be centered upon each clearspace between each pair of instruments, an additional occulted double segment as shown of maximum width 1.0 inches (2.5−1.5) which further reduces the portion seen at a glance to 86 percent and requires a head motion of 1.0 inches to see all. If the horizontal clearances between columns are made 1.0 inches, the occulted double segments appearing in the clearspaces are of maximum width 1.5 inches and reduce the portion seen at a glance to 76 percent, requiring a head motion of 1.5 inches to see all. If the horizontal clearances between columns are made 0.5 inches, the occulted double segments appearing in the clearspaces are of maximum width 2.0 inches and reduce the portion seen at a glance to 61 percent, requiring a head motion of 2.0 inches to see all. Lastly, if the horizontal clearance between columns of instruments is eliminated and the instruments are touching, the occulted double segments appearing in the rudimentary clearspaces are of maximum width 2.5 inches and reduce the portion seen at a glance to 42 percent, requiring a head motion of about 2.5 inches including some vertical component, to see all. The holes giving ii vision still appear above and below each pair of instruments.

My conclusion is that no matter how compact an instrument array the designer requires, it can be achieved by rear mounted cylindrical instrument cases having bits of clearspace to the right and left of at least a portion of each instrument and still provide the pilot with a distant view of a considerable fraction of the scene at a glance, the remainder being seen by moderate motion of the pilot's head, which motion can further align his head to see desired distant objects with both eyes simultaneously.

Figure 33:
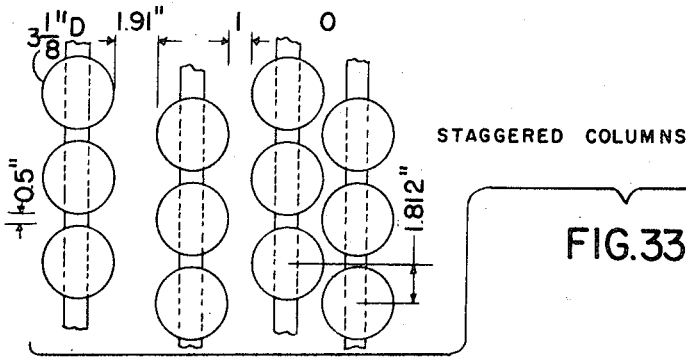
FIG. 33 shows similar groups of instruments but with the alternate columns staggered by one-half the vertical spacing.
Figure 34:
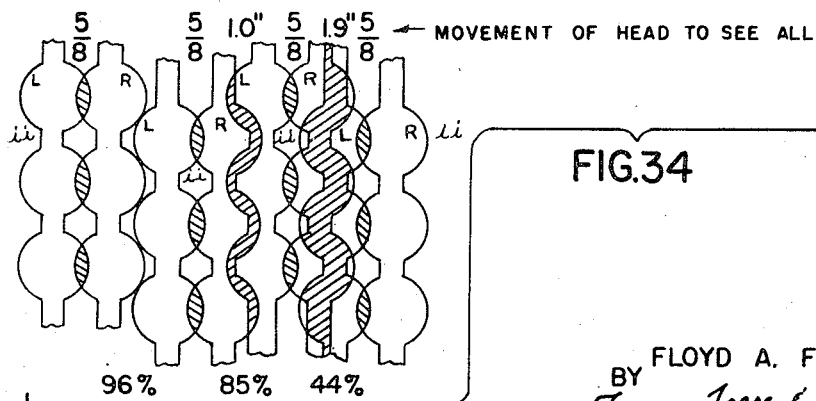
FIG. 34 shows the resulting improved distant field for a given horizontal clearance.

A further improved instrument array is shown in FIG. 33 with its distant field in FIG. 34. Alternate columns are lowered by one-half the vertical distance between instrument centers, namely ½(3.125+0.50) = 1.812 inches, so that the adjacent columns are staggered. This enables the FIG. 33 columns to be placed closer together than in FIG. 31 without overlapping circles appearing in the clearspaces of FIGS. 34 and 32.

For example, FIG. 33 shows a lateral clearance of only 1.91 inches to achieve a clearspace with 96 percent visible at a glance whereas FIG. 31 requires a lateral clearance of 2.5 inches for 96 percent visible. With lateral clearspace in FIG. 33 of 1.0 inch, the resulting field of FIG. 34 shows 85 percent visible at a glance and a head movement of 1.0 inch to see all, while FIG. 31 with lateral clearance of 1.0 inch results in FIG. 32 showing 76 percent visible at a glance and a required head movement of 1.5 inches to see all. Finally, with a lateral clearance of 0, FIG. 34 shows 44 percent visible at a glance with head movement of 1.9 inches to see all, while FIG. 32 shows 42 percent visible at a glance, with a head movement of 2.5 inches required to see all. Therefore, the staggered columns of FIG. 33 are advantageous in all respects.

Instrument arrays of the several types described above can be advantageously used in helicopters as well as in airplanes, to improve the pilot's vision which is usually partially occulted by an opaque instrument panel occupying a considerably solid angle as seen by the pilot. Furthermore, instrument arrays of these types can be used in airplanes regardless of their engine placement(s) whenever a transparent window can be provided for the pilot to see out of through the instrument array.

Stressed Skin Structure That The Pilot Can See Through

It is well known that a stronger or lighter airplane structure can be built by fastening the metal airplane covering rigidly to the main structural members so that the metal covering becomes a primary load carrying member, carrying principally tension and shear. (See Van Sickle's "Modern Airmanship," p. 87, Van Nostrand, 1961 Edition.) This is called "stressed skin structure." Metals are useful for the stressed skin because of their high unit strength but they are opaque. Transparent materials are less strong. Again utilizing the fact that the pilot has two eyes displaced by an interpupillary distance, I can provide a sheet of metal still of useful strength even though it has carefully spaced holes cut in it. Upon looking through this sheet when the eyes are diverged and focused for the distant scene, the number of holes in the metal sheet appears to be doubled and a separate portion of the distant scene may be seen with each set. By proper design the portion of the distant scene which is seen by the Right eye can be made to overlie a portion not seen by the Left eye, and vice versa, so that the fields of view from the two eyes are added, this being achieved by spacing transparent hole and opaque sheet so that they appear 2.5 inches apart when viewed along lines of regard of seated observer with eyes diverged and focused for distance. Or if desired, holes or portions thereof can be placed so that they appear 2.5 inches apart when viewed along the lines of regard of seated observer, in which case at least part of the distant scene will be seen simultaneously with both eyes, (areas again marked ii), the most acute vision though it results in a smaller percentage of the scene being seen at a glance. By moving his head somewhat, the plane occupant can see the remainder of the distant scene. By arranging the holes so that they have different spacings in different directions, the observer can change his view through the holes from maximum field of view to maximum area of vision with both eyes (ii), by rotating his head toward his right or left shoulder by roughly 22.5° away from level; the level eye position will then give an intermediate result, some ii and a considerable field of view which can be compensated by moderate head motion.

To keep out wind and weather, the holes in the metal sheet can be filled or covered on the outside by a transparent material. One way to do this is to cover the metal sheet with a roughly parallel transparent sheet also affixed to the surrounding frame and, if necessary, to put a slight bow in the transparent sheet to permit it to relieve itself of stress when the frame deflects by the small amounts permitted by the metal sheet. The transparent sheet can be affixed at intervals to the metal sheet which may contribute to its support thereby permitting a thinner transparent sheet to be used. Though putting vision holes in the metal sheet weakens it somewhat, it also lightens it and permits a thicker sheet to be used while still giving the same weight per square foot. The metal sheet can be perforated so as to give at least one-half the tensile strength of the same weight per square foot of untreated metal, and still yield practicable vision through it.

This type of structure may be used in a variety of places in a plane where the lines of vision and force must cross, including sidewalls and floors, such as for example, the design of the lower half of window 20 in FIG. 4, starboard side (opposite side). A resulting structure is illustrated in FIGS. 35 and 36. FIG. 36 shows side frame members 22 (one slanting at an angle of 22.5°) affixed to bottom sill 112 under window 20 whose lower half is delimited by brace 113. In order to strengthen this quadrilateral and keep it from folding up when more strongly stressed, perforated metal cover sheet or screen 114 is firmly affixed around the boundaries of the quadrilateral by fasteners, such as screws 115. In this example, the perforation consists of a repeating pattern of holes 2.5 inches diameter placed with centers around a square 3.538 inches on an edge whose diagonal is therefore 5.0 inches long, the whole pattern being installed 22.5° from level as shown in FIG. 36. FIG. 35 is section AA through FIG. 36 and shows in addition to the perforated metal sheet or screen 114, the slightly bowed transparent cover sheet 116 fastened both to the frame members 22, and near the center of the metal sheet at fastener 117.

It results that if, as shown in FIG. 38, the eyes are tipped 22.5° toward the left shoulder so that the interpupillary line and a line of 5.0 inches spacing of holes (2.5 inches clearance) can lie in one plane, then the central portion of the sheet (exclusive of edge effects) will permit the FIG. 38 distant field of vision, the Left eye seeing most of what the Right eye misses and the adjacent lines of holes appearing tangent. It results that 78 percent of the distant field of view is perceived at a glance through the metal sheet, and by moving his head sideward 1.4 inches the observer can see all, the transparent holes appearing to sweep over the crosshatched portions. With this orientation the observer see no part of the field with both eyes (ii).

By tipping his eyes 22.5° toward his right shoulder as shown in FIG. 39, so that the interpupillary line and a line of 3.538 inches spacing of holes (1.038 inches clearance) can lie in one plane, then the central portion of the sheet will permit the FIG. 39 distant field of vision of 59 percent, the Left and Right eye fields overlapping somewhat to yield double segments about 1.46 inches wide of ii vision covering 19 percent of the area. By moving the head 2.5 inches the observer can see the crosshatched remainder. It is useful to scan the view in the FIG. 38 head orientation and thereafter identify distant objects by moving them to an ii hole in the FIG. 39 orientation.

Keeping the eyes level yields the distant field shown in FIG. 37 including the edge effects. In the central portion 68 percent of the field is visible including 10 percent which is ii and a double segment 0.95 inch wide. Move head 2.7 inches to see all.

Any of these field patterns may be favored over the others by installing the metal sheet oriented with its pattern favoring the eye level position. Hole diameters or thickness may be changed without changing center distances in order to influence sheet strength. But if both the hole diameter and the spacing are changed in the same ratio, maintaining the same proportions as in FIG. 36, the following hole diameters have been found to have particularly useful properties for vision, as shown in FIG. 40: 6, 4, 2.5, 2.0, 1.25 and 0.625 inches. Square and elliptical holes may also be used.

In the claims, the word "instruments" shall include indicating instruments, radios, engine controls and systems controls.

Unless otherwise stated in the claim, the position of a pilot's head or eyes in a claim shall be located relative to the pilot's seat having back and bottom the middle of whose line of intersection determines a seat reference point from which 6 inches forward and 30 inches upward a normal position of pilot's eye midpoint is determined, the pilot's normal eye points being 1.25 inches port and starboard thereof.

I claim:

1. An aircraft instrument array that a pilot can see a distant scene through, comprising:
   a transparent window in the outer surface of a fuselage,
   a pilot's seat in said fuselage having back and bottom the middle of whose line of intersection determines a seat reference point from which 6 inches forward and 30 inches upward a normal position of pilot's eye midpoint is determined, the pilot's normal eye points being 1.25 inches port and starboard thereof,
   two or more columns each one instrument wide of circularly cylindrical opaque instruments of nominal diameter 3⅛ inches placed between said normal eye points and said window, with such clearance between adjacent columns of instruments as to provide some clearspace to the right and left of individual instruments if viewed from one of said normal eye points, and
   each column of instruments being attached to a separate support which lies between that column and said window and has a trans-sight projection less than 2⅛ inches if viewed from said normal eye points.

2. An aircraft instrument array that a pilot can see a distant scene through, comprising:
   a transparent window in the outer surface of a fuselage,
   a pilot's seat in said fuselage having back and bottom the middle of whose line of intersection determines a seat reference point from which 6 inches forward and 30 inches upward a normal position of pilot's eye midpoint is determined, the pilot's normal eye points being 1.25 inches port and starboard thereof, and
   two or more columns each one instrument wide of circularly cylindrical opaque instruments of nominal diameter 3⅛ inches supported between said normal eye points and said window, the center of an instrument in one column being on the level of the midpoint between centers of two instruments in an adjacent column, and with such clearance between adjacent columns of instruments as to provide some clearspace to the right and left of individual instruments if viewed from one of said normal eye points.

3. An aircraft instrument array according to claim 2, wherein:
   each column of instruments is attached to a separate support which lies between that column and said window and has a trans-sight projection less than 2⅛ inches if viewed from said normal eye points.

4. An aircraft instrument box and panel that the pilot can see through, comprising:
   a transparent window in the outer surface of a fuselage,
   a multiplicity of opaque instruments placed between the pilot's head and said window and oriented for his viewing, said individual instruments being sufficiently small and so oriented that the trans-sight projections of individual instruments as seen by the pilot are less than the pilot's interpupillary distance, and said instruments being so placed as to have to the left-hand and to the right-hand sides of the individual instruments transparent clearspaces having trans-sight projections as seen by the pilot exceeding the pilot's interpupillary distance, and said individual instruments have trans-sight projections as seen by the pilot equal to or less than 2.12 inches, and wherein said transparent clearspaces have trans-sight projections as seen by the pilot equal to or greater than 2.85 inches.

5. An aircraft instrument panel array for an aircraft having a fuselage, comprising:

a transparent window in the outer surface of a fuselage, a multiplicity of opaque instruments placed between the pilot's head and said window and oriented for his viewing, said instruments being aligned with the pilot's eyes and the distant scene, said instruments being mounted approximately side-by-side in a single lateral panelette, said instruments being so oriented that their central axes substantially intersect the pilot's interpupillary line or its extension, there being a clearspace transparent to the pilot's vision both above and below said lateral panelette, there being additionally a vertical panelette carrying one or more instruments in a single vertical column, said instruments on the vertical panelette being so placed and oriented that their central axes are parallel to the line of flight and lie in a vertical plane passing through the center of the pilot's head.

6. An aircraft instrument panel array according to claim 5, wherein:

at least part of said vertical panelette and its instruments has a trans-sight projection as seen by the pilot, less than 2.12 inches.

7. An aircraft instrument panel array according to claim 5, wherein:

at least part of said vertical panelette and its instruments has a trans-sight projection as seen by the pilot, less than 2.12 inches, and that part is bounded on its left and right by clearspaces having trans-sight projections as seen by the pilot, equal to or exceeding 2.85 inches.

8. An aircraft instrument array that a pilot can see a distant scene through, comprising:

a fuselage surrounding a pilot, an array of a plurality of adjacent opaque aircraft instruments of a set of instruments for the navigation and control of an aircraft, the instruments of said array being oriented for said pilot's viewing and being so placed and supported that the array extends both right and left and up and down across said pilot's lines of regard to said array, the individual instruments of said array further being so placed and supported that adjacent instruments have clearance spaces between them through which the pilot can see beyond the instruments with at least one eye, a transparent window in the outer surface of said fuselage, lying beyond said instrument array as seen by said pilot and occupying at least the solid angle subtended by said instrument array with the pilot's nose as vertex, with the object of converting said clearance spaces into clearspaces through which the pilot perceives the sum of the two distant views seen by his right and left eyes separately, thereby perceiving the distant scene within the same solid angle occupied by said array of intervening opaque instruments.

9. An aircraft instrument array according to claim 8, wherein:

a multiplicity of the clearspaces between adjacent individual opaque instruments have maximum lateral width less than 2.5 inches.

10. An aircraft instrument array in accordance with claim 8, wherein:

the individual instruments of said array are so oriented and supported that their central axes lie in vertical planes which pass through said pilot's head.

11. An aircraft instrument array in accordance with claim 8, wherein:

the individual instruments of said array are supported from their ends which lie between the instruments and said window by supports having trans-sight projections of 2.5 inches or less.

12. An aircraft instrument array in accordance with claim 8, wherein:

said clearance spaces, lie immediately on the right hand sides and immediately on the left-hand sides of the individual instruments of the array.

13. An aircraft instrument array that a pilot can see a distant scene through, comprising:

a transparent window in the outer surface of a fuselage, a pilot's seat in said fuselage having a back and bottom the middle of whose line of intersection determines a seat reference point from which 6 inches forward and 30 inches upward a normal position of pilot's eye midpoint is determined, the pilot's normal eye points being 1.25 inches port and starboard thereof, and a multiplicity of opaque instruments of nominal diameters 3⅛ inches between said normal eye points and said window, oriented to be read from said normal eye points, and supported in a line by instrument mounting means which provide clearspace on right and left of individual instruments as seen from at least one of said normal eye points, said instrument mounting means consisting of a transparent instrument panel in which said instruments are mounted.

14. An aircraft instrument box and panel that the pilot can see through, comprising: a transparent window in the outer surface of a fuselage, and a multiplicity of instruments placed between the pilots' head and said window and oriented for his viewing, said instruments being divided into a multiplicity of groups with instruments within each group mounted approximately one above the other on a panelette with their central axes lying in one vertical plane passing approximately through the center of the pilot's head, the various groups being supported with such lateral spacing as to provide transparent clearspaces between groups of trans-sight projections as seen by the pilot exceeding the pilot's interpupillary distance wherein; said individual group of instruments with its panelette has a trans-sight projection as seen by the pilot equal to or less than 2.12 inches, and said transparent clearspace between adjacent groups of instruments has a trans-sight projection as seen by the pilot equal to or exceeding 2.85 inches.

15. An aircraft instrument panel past which the pilot can see a continuous scene, comprising: a transparent window in the outer surface of a fuselage, and a set of opaque instruments for the flying of an aircraft placed between the pilot's head and said window and oriented for his viewing, said instruments being mounted approximately one above the other with the central axes of said instruments lying in one vertical plane passing approximately through the center of the pilot's head, there being on the left and on the right of the individual instruments transparent clear-spaces having trans-sight projections as seen by the pilot exceeding 2.85 inches, wherein said instruments have throughout most of their vertical length a trans-sight projection as seen by the pilot less than the pilot's interpupillary distance.

16. An aircraft instrument panel past which the pilot can see a continuous scene, comprising: a transparent window in the outer surface of a fuselage, and a set of opaque instruments for the flying of an aircraft placed between the pilot's head and said window and oriented for his viewing, said instruments being mounted approximately one above the other with the central axes of said instruments lying in one vertical plane passing approximately through the center of the pilot's head, there being on the left and on the right of the individual clearspaces transparent clear-spaces having trans-sight projections as seen by the pilot exceeding 2.85 inches, wherein said instruments have throughout most of their vertical length a trans-sight projection as seen by the pilot equal to or less than 2.12 inches.

* * * * *